(12) United States Patent
Fujiwara et al.

(10) Patent No.: US 7,576,737 B2
(45) Date of Patent: Aug. 18, 2009

(54) IMAGE PROCESSING DEVICE AND PROGRAM

(75) Inventors: Koichi Fujiwara, Kobe (JP); Osamu Toyama, Kakogawa (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 303 days.

(21) Appl. No.: 11/226,522

(22) Filed: Sep. 14, 2005

(65) Prior Publication Data
US 2006/0066611 A1    Mar. 30, 2006

(30) Foreign Application Priority Data
Sep. 24, 2004  (JP)  ............................. 2004-277222
Sep. 29, 2004  (JP)  ............................. 2004-284598

(51) Int. Cl.
*G06T 15/00*  (2006.01)
(52) U.S. Cl. ..................................................... 345/419
(58) Field of Classification Search ...................... None
See application file for complete search history.

(56) References Cited

U.S. PATENT DOCUMENTS

| | | | | |
|---|---|---|---|---|
| 5,644,689 A | * | 7/1997 | Ban et al. ................... | 345/424 |
| 5,823,958 A | * | 10/1998 | Truppe ....................... | 600/426 |
| 5,999,186 A | * | 12/1999 | Jackson ...................... | 345/420 |
| 6,332,035 B1 | * | 12/2001 | Basu et al. .................. | 382/128 |
| 6,810,278 B2 | * | 10/2004 | Webber et al. ............. | 600/407 |
| 2005/0267352 A1 | * | 12/2005 | Biglieri et al. ............. | 600/410 |

FOREIGN PATENT DOCUMENTS

JP       2000-348195 A    12/2000
JP       2002-183748 A     6/2002

* cited by examiner

*Primary Examiner*—Xiao M Wu
*Assistant Examiner*—Said Broome
(74) *Attorney, Agent, or Firm*—Sidley Austin LLP

(57) ABSTRACT

A virtual plane of projection on which a virtual three-dimensional object constructed by a set of specific structures oriented in predetermined directions is projected is set. First, while generating a basic image by projecting one specific structure oriented in a predetermined direction onto the virtual plane of projection, a reference image position corresponding to a reference position of the one specific structure in the basic image is recognized. At the time of projecting a virtual three-dimensional object onto the virtual plane of projection, each of reference projection positions in which the reference positions of specific structures constructing the virtual three-dimensional object are projected is detected. Further, by combining adjusted basic images generated by adjusting the positions of the basic images relative to the virtual plane of projection in accordance with the reference projection positions, a display image is generated.

14 Claims, 19 Drawing Sheets

F I G . 3
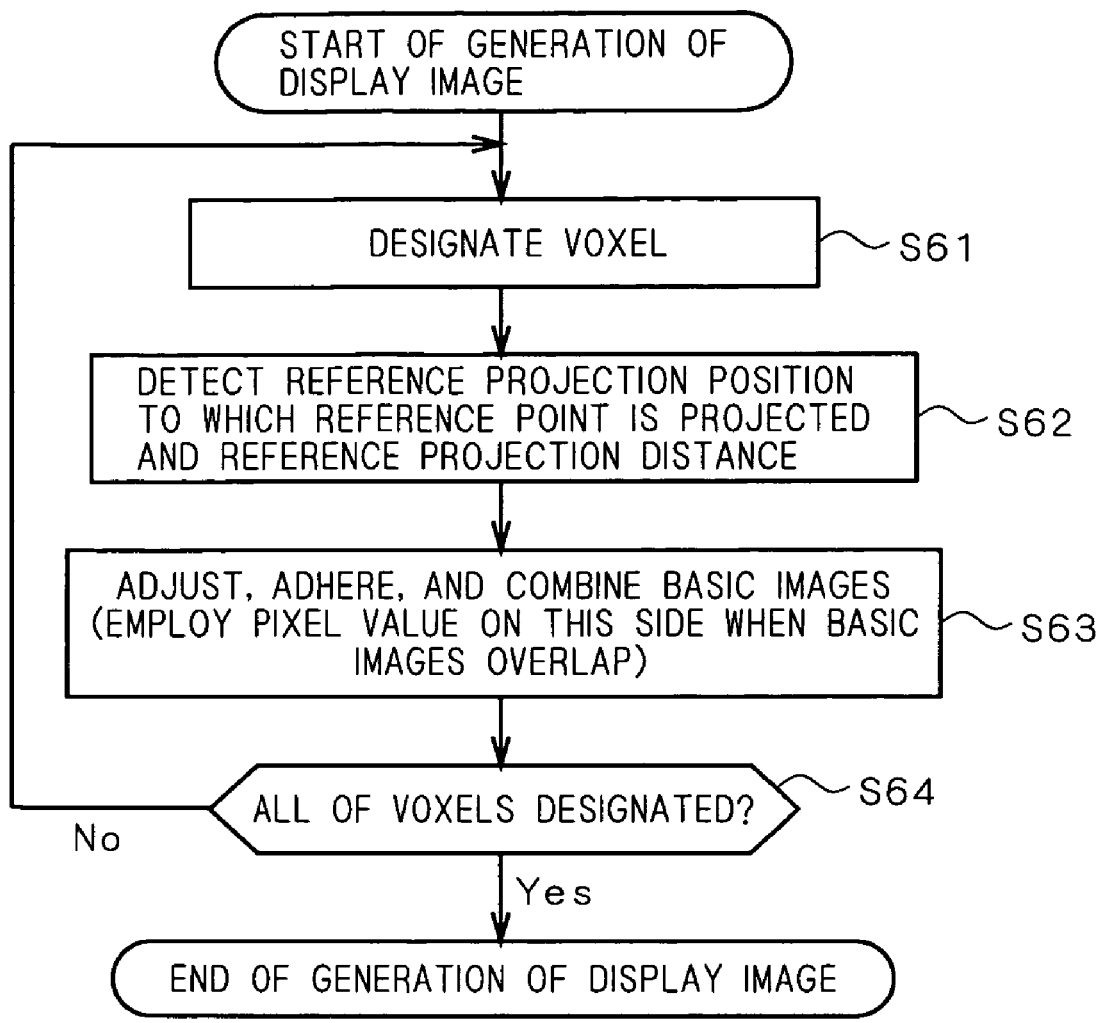

F I G. 4
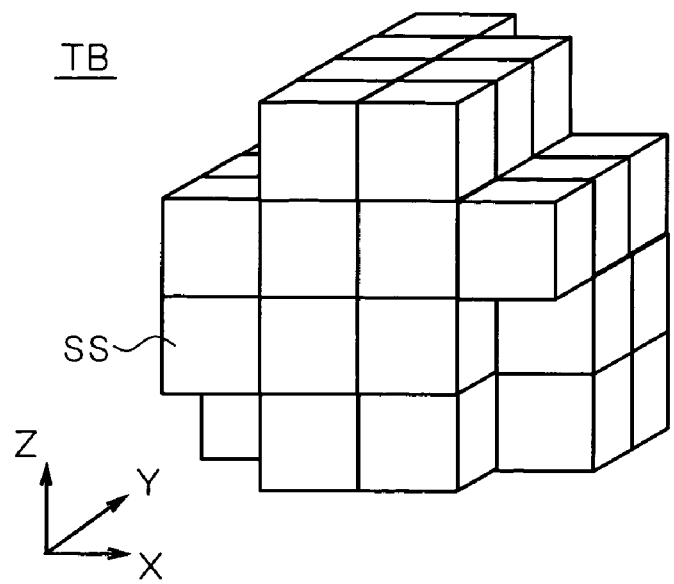
F I G. 5
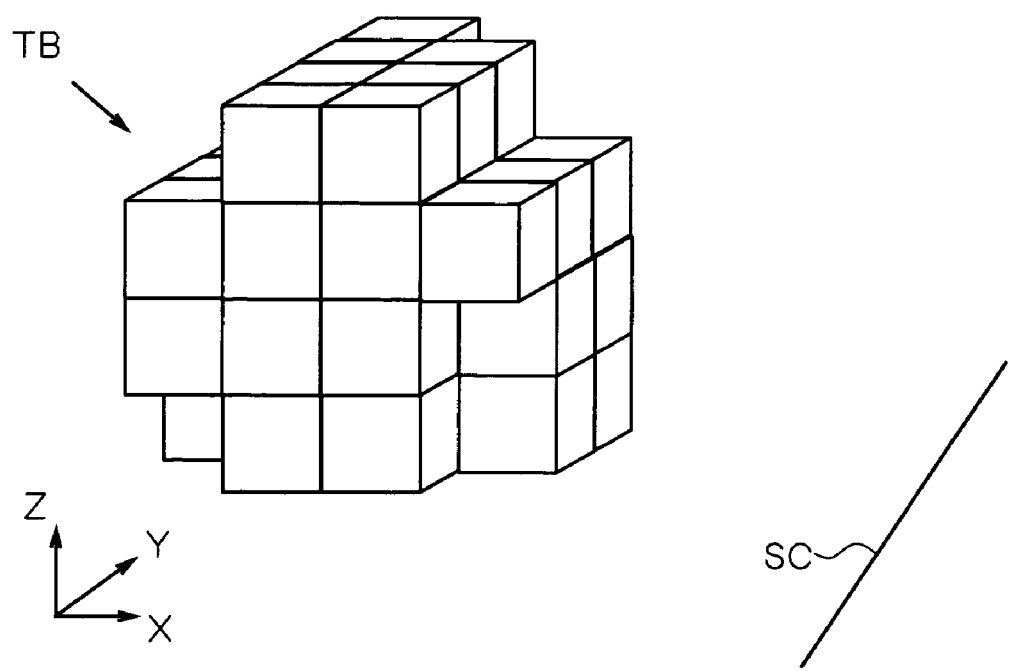

FIG. 6A
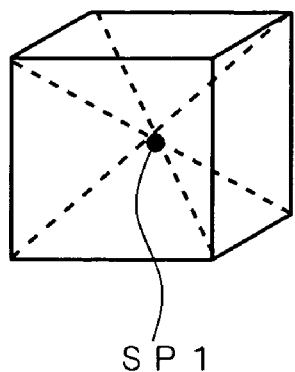
SP1
FIG. 6B
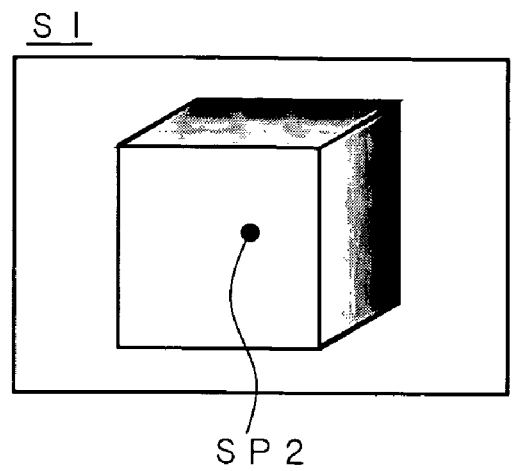
SP2
FIG. 7
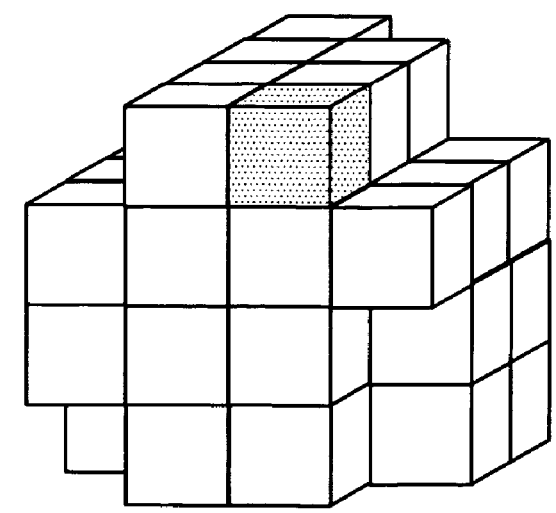
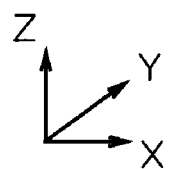

F I G . 1 3
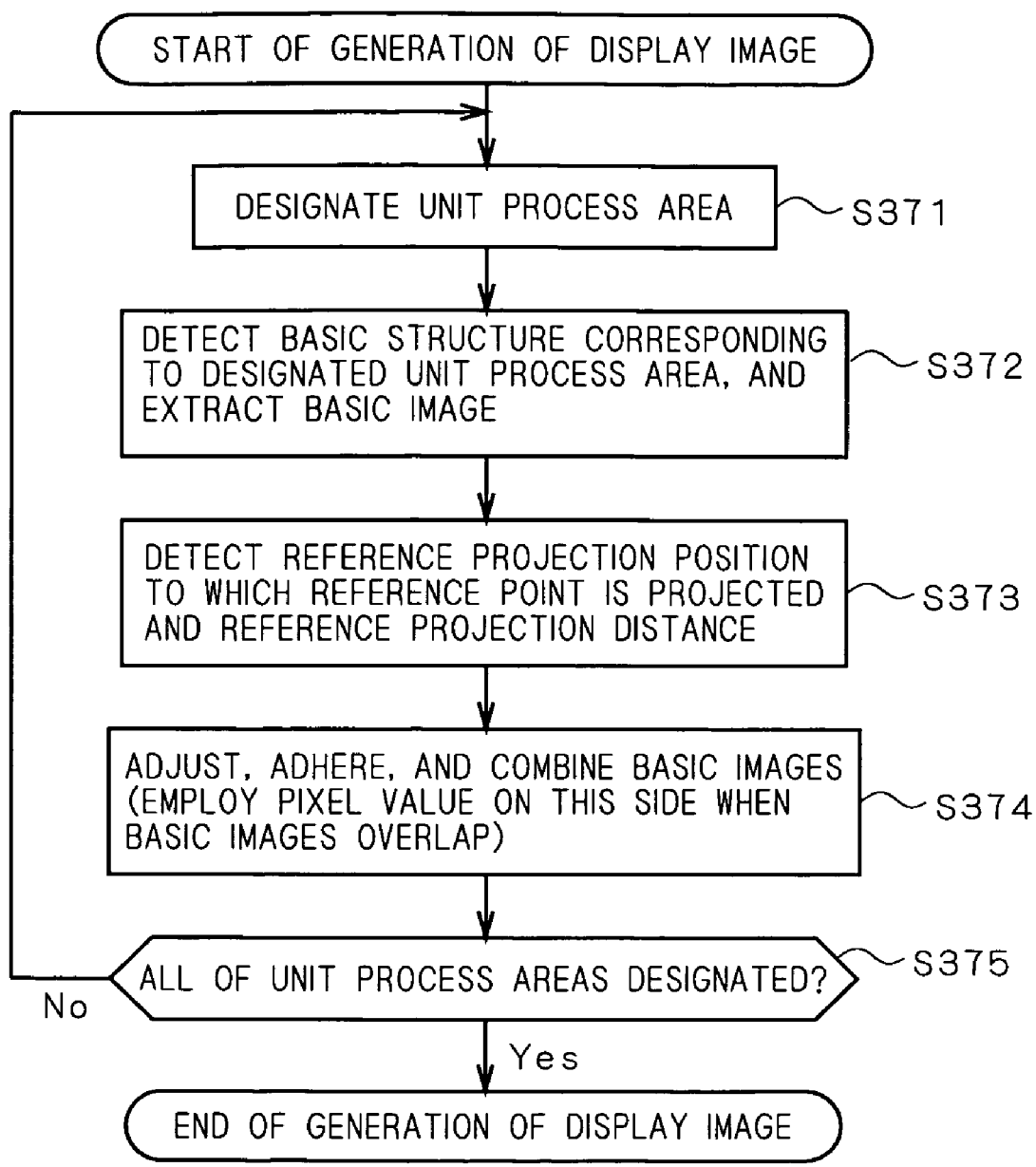

C1

C2

F I G . 2 0
DM1
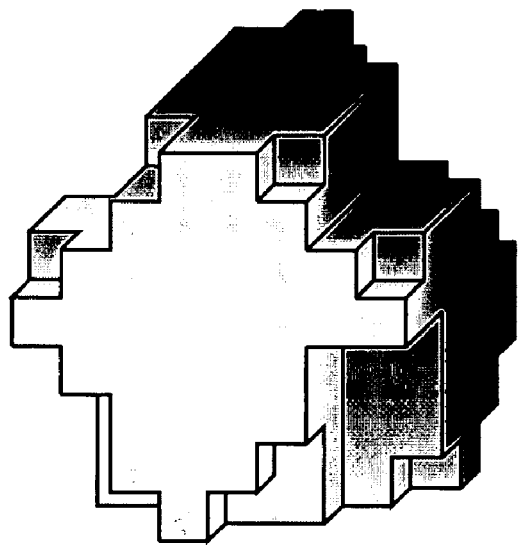
F I G . 2 1
DM2
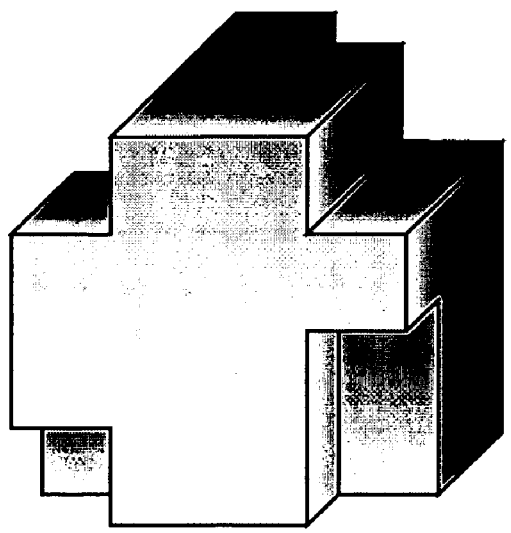

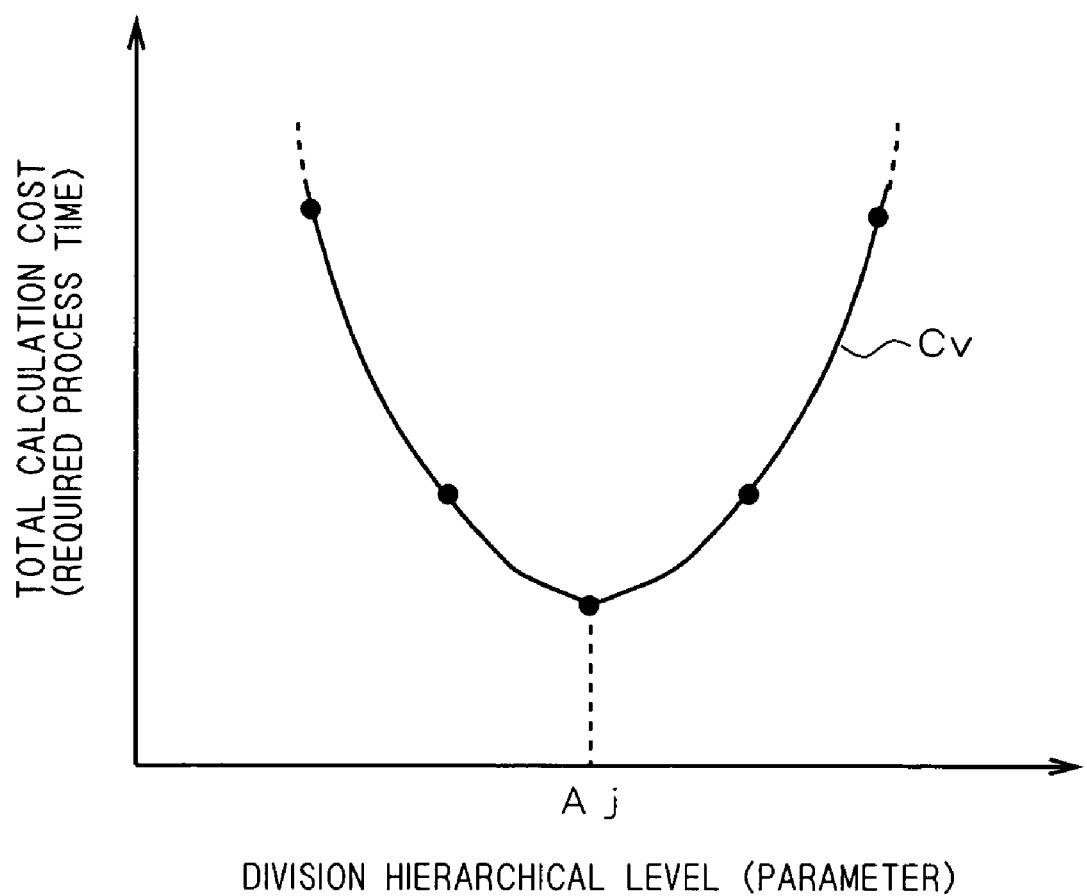
F I G . 2 6

IMAGE PROCESSING DEVICE AND PROGRAM

This application is based on application Nos. 2004-277222 and 2004-284598 filed in Japan, the contents of which are hereby incorporated by reference.

BACKGROUND OF THE INVENTION

1. Field of the Invention

The present invention relates to a technique of generating an image to be displayed on the basis of three-dimensional data.

2. Description of the Background Art

As a method of visualizing (imaging) and displaying data indicative of a three-dimensional object (volume data), a method called volume rendering is known.

The volume rendering includes a method called ray casting. In the ray casting, each time a plane of projection is set, for example, a map (depth map) indicative of a distribution of distances between the plane of projection and a three-dimensional object is generated. By performing sampling along the sight line, volume data is imaged.

By performing various computations by hardware to image volume data at high speed, a problem occurs such that the size of the hardware increases. To address the problem, a technique capable of imaging larger volume data at high speed by hardware of limited size has been proposed (for example, Japanese Patent Application Laid-Open No. 2000-348195).

In the volume rendering, however, each time the direction of sight line, that is, the plane of projection changes, for example, a depth map is re-generated and re-imaging has to be performed, so that a larger amount of computation is necessary. Consequently, some time is necessary to switch visual images in accordance with a change in the direction of sight line. In particular, when the amount of volume data is large, it is difficult to switch images smoothly.

The ray casting includes so-called object order rendering and image order rendering (for example, Japanese Patent Application Laid-Open No. 2002-183748).

The volume rendering is often used in a scene of visualizing volume data of a three-dimensional object such as an internal organ on a screen at a medical site. At the time of observing an affected area or the like while properly changing the direction of sight line, it is desired to switch a display image quickly so as not to apply stress on the user.

For this purpose, various methods of performing volume rendering at higher speed have been devised and proposed. Among them, ray casting of a type (hybrid type) is known in which each time the plane of projection is set, an object order process for generating a depth map indicative of a distribution of distances between the plane of projection and a three-dimensional object is executed, and an image order process of performing sampling along each of sight lines by using the generated depth map is executed, thereby visualizing volume data.

In the conventional ray casting of the hybrid type, generation precision of a depth map is fixed. For example, when the generation precision of a depth map is fixed to be high, there is a tendency that a computation amount of the object order process is relatively large, and a computation amount of the image order process is relatively small. On the other hand, when the generation precision of a depth map is set to be low, there is a tendency that the computation amount of the object order process becomes relatively small, and the computation amount of the image order process becomes relatively large.

However, a problem occurs such that the depth map is generated too roughly or too finely in order to suppress computation time of the image order process, depending on the shape of a three-dimensional object, the entire process time required for the volume rendering increases excessively. In short, the balance between the generation precision of a depth map and the time required to generate an image to be displayed has not been considered much until now. It takes long time to generate an image to be displayed and to switch a display image, and it is difficult to smoothly change a display image in accordance with the switch of the plane of projection, that is, the direction of sight line.

SUMMARY OF THE INVENTION

The present invention is directed to an image processing device.

According to the present invention, the device includes: a reader for reading and storing three-dimensional data indicative of a structure of a virtual three-dimensional object constructed by a set of specific structures oriented in a predetermined direction into a predetermined storage; a projection plane setter for setting a directional relationship between a virtual plane of projection on which the virtual three-dimensional object is projected and the virtual three-dimensional object; a reference position setter for setting a reference position of a specific structure included in the set of specific structures; a basic image generator for generating a basic image by projecting the specific structure oriented in the predetermined direction onto the virtual plane of projection in accordance with the directional relationship and, also, recognizing a reference image position corresponding to the reference position in the basic image; a detector for detecting each of reference projection positions in which the reference position of each specific structure included in the set of specific structures is projected to the virtual plane of projection at a time of projecting the virtual three-dimensional object onto the virtual plane of projection; an adjusted image generator for generating adjusted basic images on the basis of the basic image by adjusting a positional relationship between the basic image and the virtual plane of projection in accordance with the each of reference projection positions detected by the detector; and a display image generator for generating a display image by combining the adjusted basic images to each other.

The computation amount since the plane of projection is set until the display image is generated can be reduced; therefore, imaging of volume data can be performed at high speed.

According to another aspect of the present invention, the device includes: a reader for reading and storing three-dimensional data indicative of a structure of a virtual three-dimensional object constructed by a set of specific structures oriented in a predetermined direction into a predetermined storage; a projection plane setter for setting a directional relationship between a virtual plane of projection on which the virtual three-dimensional object is projected and the virtual three-dimensional object; a basic structure setter for setting basic structures in a plurality of patterns each constructed by an arrangement pattern of at least one specific structure included in the set of specific structures in a unit process area in which a predetermined number of specific structures included in the set of specific structures can be arranged; a reference position setter for setting a reference position of each of the basic structures in a plurality of patterns; a basic image generator for generating basic images in a plurality of patterns by projecting the basic structures in a plurality of patterns onto the virtual plane of projection in accordance with the directional relationship and, also, recognizing a reference image position corresponding to the reference position of each of the basic structures in a plurality of patterns for each of the basic images in a plurality of patterns; an area designator for sequentially designating a unit process area to be projected in a three-dimensional area to be processed at a time of projecting the virtual there-dimensional object onto the virtual plane of projection; a first detector for detecting a basic structure which matches the unit process area to be projected designated by the area designator from the basic structures in a plurality of patterns; an extractor for extracting a basic image corresponding to the basic structure detected by the first detector from the basic images in a plurality of patterns; a second detector for detecting a real reference projection position in the virtual plane of projection, to which the reference position of the basic structure detected by the first detector is projected; an adjusted image generator for generating adjusted basic images on the basis of the basic image extracted by the extractor by adjusting a positional relationship between the basic image and the virtual plane of projection in accordance with the real reference projection position in each the unit process area; and a display image generator for generating a display image by combining the adjusted basic images to each other.

The computation amount since the plane of projection is set until the display image is generated can be reduced; therefore, imaging of volume data can be performed at high speed.

According to still another aspect of the present invention, the device includes: a reader for reading and storing three-dimensional data indicative of a structure of a virtual three-dimensional object constructed by a set of specific structures oriented in a predetermined direction into a predetermined storage; a projection plane setter for setting a positional and directional relationship between a virtual plane of projection on which the virtual three-dimensional object is projected and the virtual three-dimensional object; a reference position setter for setting a reference position of a specific structure included in the set of specific structures; a basic distance map generator for detecting a reference projection position in which the reference position of the specific structure oriented in the predetermined direction is projected onto the virtual plane of projection and a reference projection distance as a distance between the reference position and the reference projection position in accordance with the positional and directional relationship and, also, detecting projection distances as distances between each of predetermined points on the virtual plane of projection and the specific structure, thereby generating a basic distance map indicative of a distribution of distances between the virtual plane of projection and the specific structure using the reference projection distance as a reference; a detector for detecting each of reference projection positions and each the reference projection distance corresponding to each the specific structure on the virtual plane of projection by using each the specific structure constructing the virtual three-dimensional object as a target; an adjusted map generator for generating adjusted basic distance maps on the basis of the basic distance map by adjusting a positional relationship between the basic distance map and the virtual plane of projection and each of the projection distances in accordance with the each of reference projection positions and the each of reference projection distances detected by the detector; and a distance map generator for generating a general distance map indicative of a distribution of distances between the virtual three-dimensional object and the virtual plane of projection by employing a minimum projection distance for a projection position in which a plurality of the adjusted basic distance maps overlap in the virtual plane of projection while combining the adjusted basic distance maps generated by the adjusted map generator to each other.

The computation amount since the plane of projection is set until a general distance map is generated can be reduced. As a result, the computation amount of imaging of volume data can be also reduced, so that imaging of volume data can be performed at high speed.

According to yet another aspect of the present invention, the device includes: a reader for reading and storing three-dimensional data indicative of a structure of a virtual three-dimensional object constructed by a set of specific structures oriented in a predetermined direction into a predetermined storage; a projection plane setter for setting a positional and directional relationship between a virtual plane of projection on which the virtual three-dimensional object is projected and the virtual three-dimensional object; a basic structure setter for setting basic structures in a plurality of patterns each constructed by an arrangement pattern of at least one specific structure included in the set of specific structures in a unit process area in which a predetermined number of specific structures included in the set of specific structures can be arranged; a reference position setter for setting a reference position of each of the basic structures in a plurality of patterns; a basic map generator for detecting a reference projection position in which the reference position is projected onto the virtual plane of projection and a reference projection distance as a distance between the reference position and the reference projection position in accordance with the positional and directional relationship and, also, detecting projection distances as distances between each of predetermined points on the virtual plane of projection and each of the basic structures, thereby generating basic distance maps in a plurality of patterns each indicative of a distribution of distances between the virtual plane of projection and each of the basic structures using the reference projection distance as a reference; an area designator for sequentially designating a unit process area to be projected in a three-dimensional area to be processed; a first detector for detecting a basic structure which matches the unit process area to be projected designated by the area designator from the basic structures in a plurality of patterns; an extractor for extracting a basic distance map corresponding to the basic structure detected by the first detector from the basic distance maps in a plurality of patterns; a second detector for detecting a real reference projection position in the virtual plane of projection, to which the reference position of the basic structure detected by the first detector is projected and a real reference projection distance corresponding to the real reference projection position; an adjusted map generator for generating an adjusted basic distance maps on the basis of the basic distance map extracted by the extractor by adjusting a positional relationship between the basic distance map and the virtual plane of projection and each of the projection distances in accordance with the real reference projection position and the real reference projection distance detected by the second detector; and a distance map generator for generating a general distance map indicative of a distribution of distances between the virtual three-dimensional object and the virtual plane of projection by employing a minimum projection distance for a projection position in which a plurality of the adjusted basic distance maps overlap in the virtual plane of projection while combining the adjusted basic distance maps generated by the adjusted map generator to each other.

The computation amount since the plane of projection is set until a general distance map is generated can be reduced.

As a result, the computation amount of imaging of volume data can be also reduced, so that imaging of volume data can be performed at high speed.

According to yet another aspect of the present invention, the device includes: a parameter setter for setting a parameter exerting an influence on a processing ratio between an image order process and an object order process in volume rendering to a value which varies step by step; a reader for reading and storing volume data of a three-dimensional area to be processed into a predetermined storage; a rendering part for performing volume rendering based on the volume data; a measuring part for measuring process time required for volume rendering based on the volume data by the rendering part with respect to each of parameters which are set to values which vary step by step by the parameter setter; a temporary storage for temporarily storing the parameters which vary step by step and process time measured by the measuring part in correspondence with each of the parameters which vary step by step so that each of the parameters and the process time corresponding to each of the parameters are associated with each other; and a parameter determining part for determining a parameter corresponding to a shortest process time among a plurality of process times stored in the temporary storage as a parameter for the volume data.

Once a parameter that is optimum in calculation is determined, volume rendering is performed in accordance with the parameter, thereby enabling generation of a display image to be executed in shorter time.

The present invention is also directed to a computer program for controlling a computer to operate as an image processing device for generating a display image on the basis of three-dimensional data.

The present invention is also directed to a computer program for controlling a computer to operate as an image processing device for generating a distance map on the basis of three-dimensional data.

The present invention is also directed to a computer program for controlling a computer to operate as an image processing device for generating a display image by volume rendering.

Therefore, an object of the present invention is to provide a technique capable of reducing a computation amount required for imaging volume data, that is, capable of imaging volume data at high speed.

Another object of the present invention is to provide a technique for enabling generation of a display image to be executed in shorter time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart showing an operation flow of imaging;

FIG. 4 is a schematic diagram of a three-dimensional object expressed by a set of specific structures;

FIG. 5 is a diagram illustrating setting of a plane of projection;

FIG. 6 is a diagram illustrating generation of a basic image;

FIG. 7 is a diagram illustrating designation of one voxel;

FIG. 13 is a flowchart showing an operation flow of imaging;

FIG. 20 is a diagram visually expressing a depth map;

FIG. 21 is a diagram visually expressing a depth map;

FIG. 26 is a diagram illustrating the relation between the divided hierarchical level and calculation cost.

DESCRIPTION OF THE PREFERRED EMBODIMENTS

Hereinafter, preferred embodiments of the present invention will be described with reference to the drawings.

First Preferred Embodiment

Outline of Image Processing System

Figure 1:
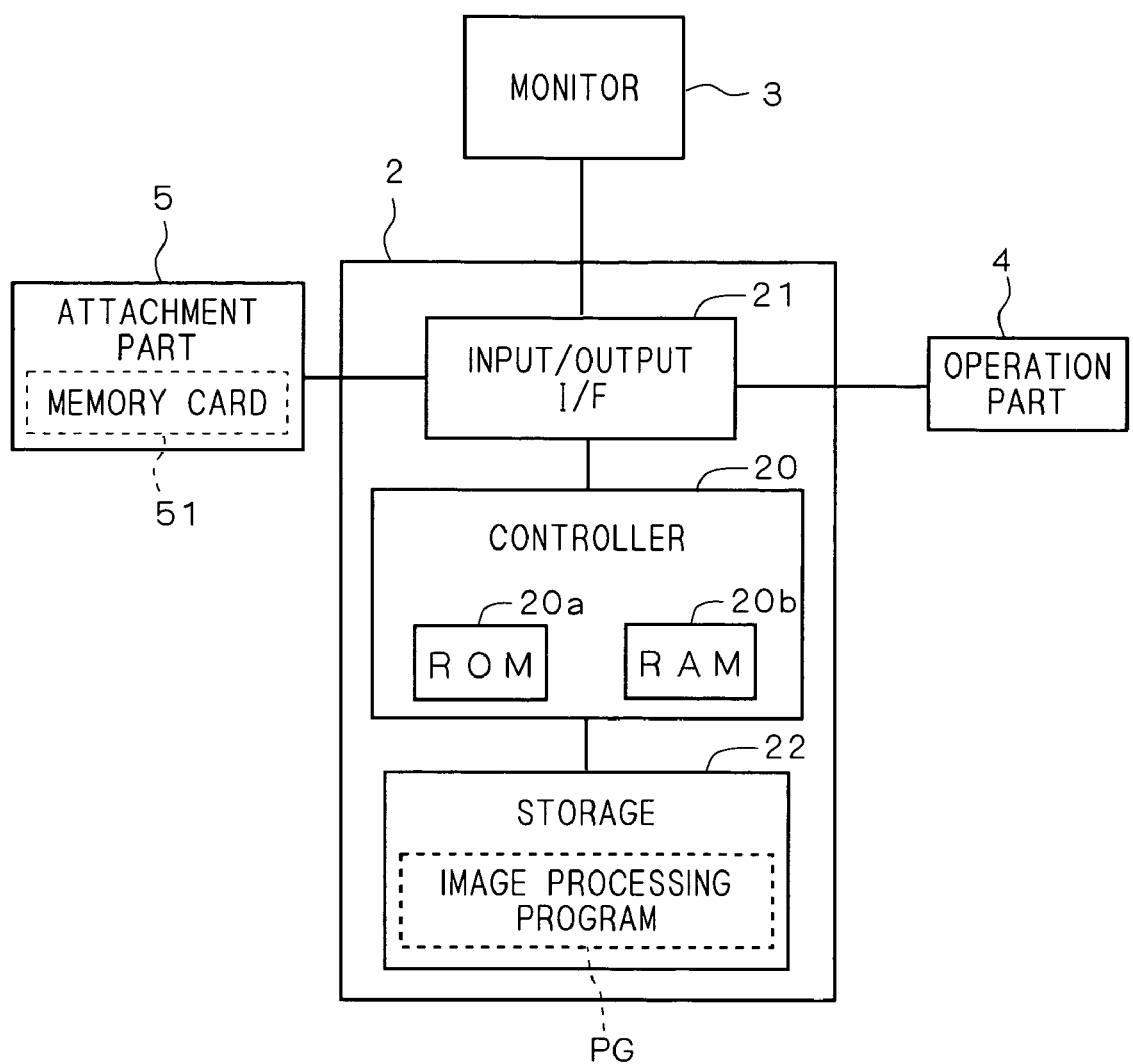
FIG. 1 is a block diagram showing a functional configuration of an image processing system.

FIG. 1 is a diagram illustrating the outline of an image processing system 1 according to a first preferred embodiment of the present invention.

The image processing system 1 has a personal computer 2, a monitor 3 and an attachment part 5 connected to the personal computer 2 so as to be able to transmit/receive data to/from the personal computer 2, and an operation part 4 with which the user inputs various selection items and the like to the personal computer 2.

The personal computer 2 includes a controller 20, an input/output I/F 21, and a storage 22.

The input/output I/F 21 is an interface (I/F) for transmitting/receiving data to/from the monitor 3, operation part 4 and attachment part 5, and transmits/receives data to/from the controller 20.

The storage 22 takes the form of, for example, a hard disk which stores an image processing program PG for realizing volume rendering (imaging) which will be described later, and adjustment of parameters in the volume rendering.

The controller 20 mainly has a CPU, a ROM 20$a$, and a RAM 20$b$ and is a part for controlling the elements of the personal computer 2 in a centralized manner. The controller 20 reads the image processing program PG stored in the storage 22 and executes it by the CPU, thereby executing volume rendering of generating image data for display (also referred to as "display image") on the basis of volume data, and outputs the display image to the monitor 3 via the input/output I/F 21. In such a manner, the personal computer 2 functions as an image processor for generating a display image on the basis of volume data by the volume rendering.

The monitor 3 takes the form of, for example, a CRT and visibly outputs the display image generated by the controller 20.

The operation part 4 is constructed by a keyboard, a mouse, and the like and transmits various electric signals to the input/output I/F 21 in accordance with various operations of the user. To the attachment part 5, a storing medium such as a memory card 51 can be detachably inserted. Various data, a program, and the like stored in the memory card 51 inserted to the attachment part 5 can be loaded to the controller 20 and the storage 22 via the input/output I/F 21.

Imaging of Volume Data

A method called voxel expression that expresses an object by a set of very small cubes (or rectangular parallelepipeds) as elements is used. The cube (or rectangular parallelepiped) as an element is called a voxel.

Generally, by using a CT (Computed Tomography) scan using an X ray, an image of a slice of a human body can be obtained. By shifting the position of the slice and by changing the cutting direction in the up-to-down, forward-to-rearward, and left-to-right directions, data in which an X-ray absorption amount is stored can be obtained on a voxel unit basis. Data expressing a distribution of concentration or density in a three-dimensional space is called "volume data". Volume data is data (three-dimensional data) obtained by dividing a three-dimensional area to be expressed by the volume data, that is, a three-dimensional area corresponding to volume data into a plurality of voxels, and giving one voxel value (in this example, a value indicative of an absorption amount of an X ray) to each voxel. The three-dimensional area corresponding to the volume data is an object to be subjected to a computing process in imaging of the volume data.

Figure 2:
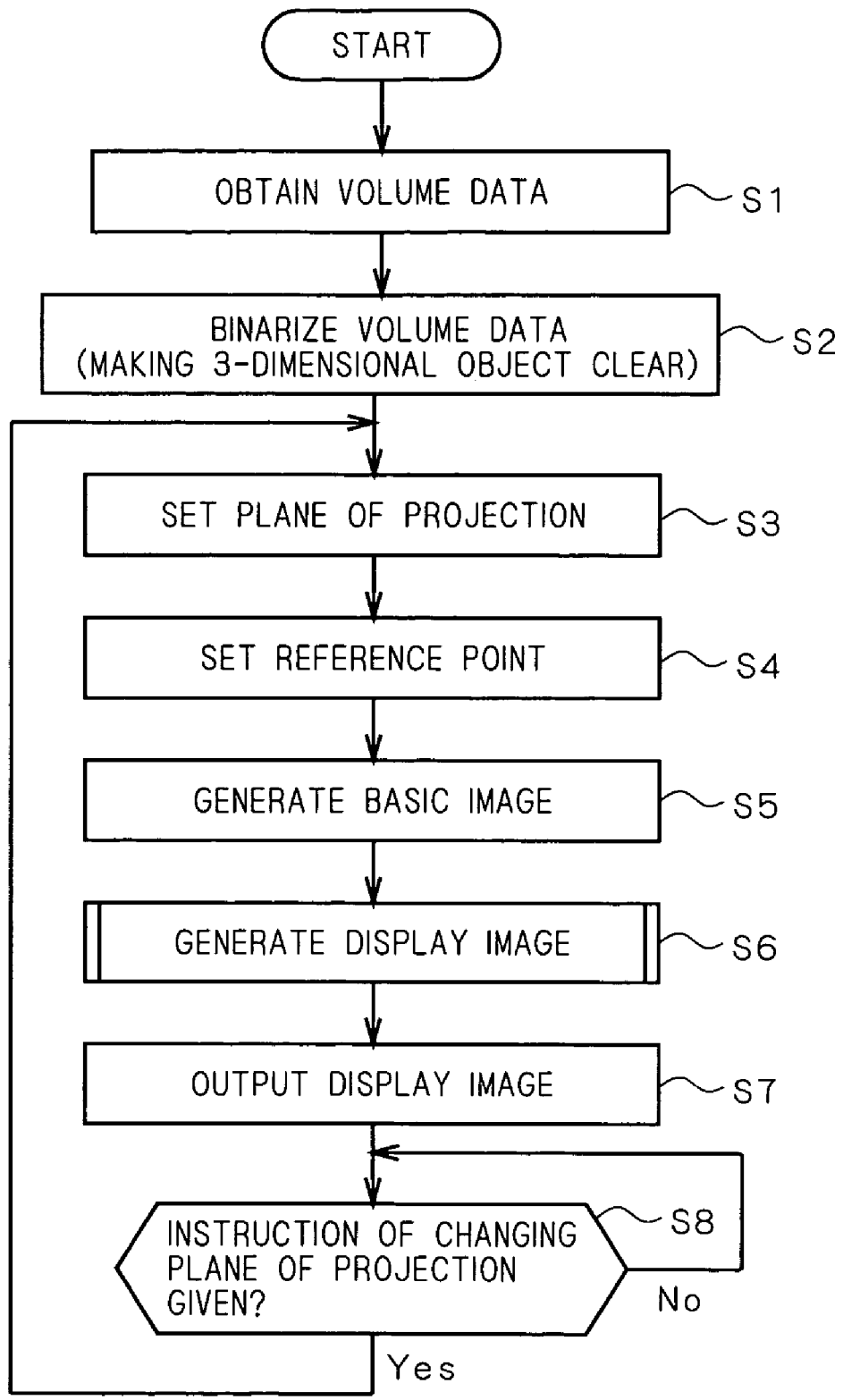
FIG. 2 is a flowchart showing an operation flow of imaging.

FIGS. 2 and 3 are flowcharts showing an operation flow of imaging volume data. The operation flow is realized when the controller 20 reads and executes the image processing program PG stored in the storage 22. First, when the user variously operates the operation part 4, imaging of volume data in the image processing system 1 (generation of a display image) starts, and the program advances to step S1 in FIG. 2.

In step S1, volume data stored in the memory card 51, the storage 22, or the like is read and obtained by the controller 20, and the program advances to step S2. In this example, the volume data is temporarily stored in the RAM 20b or the like. It is also possible to perform pre-process such as a filter process for removing noise on the volume data.

In step S2, the volume data is binarized, and the program advances to step S3. By binarizing the volume data obtained in step S1 to a voxel value included in a predetermined value range and a voxel value out of the range, the three-dimensional area of the volume data is divided into two areas of an area where a three-dimensional object to be imaged exists and the other area. By such a process, three-dimensional data (also referred to as "three-dimensional object data") indicating that the structure of a three-dimensional object to be imaged is constructed by a set of voxels (specific structures, that is, also referred to as "specific structures") oriented in a predetermined direction is generated. That is, a state where the three-dimensional object to be imaged becomes obvious is obtained. The three-dimensional object data generated is loaded into the RAM 20b or the like and is temporarily stored.

FIG. 4 is a schematic diagram showing an example of a three-dimensional object expressed by a set of voxels. FIG. 4 shows a three-dimensional rectangular coordinate system of X, Y, and Z to clarify the direction in which voxels are arranged. In the diagram, the direction of a side of a voxel is along the X, Y, or Z axis, and the voxels are arranged adjacent to each other so that the faces perfectly coincide with each other. In FIG. 4 and subsequent figures, to clarify the direction in which voxels are arranged, a similar three-dimensional rectangular coordinate system of X, Y, and Z is indicated.

As shown in FIG. 4, a plurality of voxels, that is, a plurality of specific structures SS are stacked adjacent to each other on data, thereby virtually forming a three-dimensional object TB. In the following description, as an example, it is assumed that the virtual three-dimensional object shown in FIG. 4 is imaged by the following process.

In step S3, a plane of projection to which a three-dimensional object is projected is virtually set, and the program advances to step S4. For example, in response to an operation of the operation part 4 by the user, as shown in FIG. 5, a virtual plane of projection (also referred to as "virtual projection plane") SC can be also set in an arbitrary position around the three-dimensional object TB. For example, by determining the posture and position of each of the plane SC of projection and the three-dimensional object TB in a reference coordinate system (three-dimensional rectangular coordinate system), the directional relation and the positional relation between the plane SC of projection and the three-dimensional object TB can be set.

In step S4, a reference point of a voxel (specific structure) is set, and the program advances to step S5. For example, as shown in FIG. 6A, a center point (point of the center of gravity) of a voxel is set as a reference point (also referred to as "reference position") SP1.

In step S5, by normally projecting one voxel onto the plane SC of projection in accordance with the directional relation between the voxels constructing the three-dimensional object and the plane SC of projection, image data (also referred to as "basic image") obtained by imaging one voxel is generated, and the program advances to step S6. A point corresponding to each of pixels of a basic image or a display image which will be described later will be referred to as a "pixel corresponding point" hereinafter. In step S5, by projecting voxels along a number of sight lines which are set at predetermined intervals, a basic image (FIG. 6B) S1 constructed by pixels corresponding to the sight lines is generated.

First, a distance value (also referred to as "reference projection distance value") Dst is detected, indicative of distance from the reference point SP1 of a voxel to the plane SC of projection, that is, distance of projecting the reference point SP1 (also referred to as "reference projection distance"). The reference projection distance corresponds to distance between the reference point SP1 and the position (also referred to as "reference projection position") on the plane SC of projection on which the reference point SP1 is projected.

Next, a distance value (also referred to as "projection distance value") Dpa indicative of the shortest distance (also referred to as "projection distance") between a voxel and a pixel corresponding point to which the voxel is normally projected is detected. Further, a difference value ($\Delta D = Dpa - Dst$) between the reference projection distance value Dst and the projection distance value Dpa is calculated for each pixel corresponding point. To each of the pixels of a basic image, the projection distance value Dpa corresponding to the pixel and a pixel value Vc according to the projection distance value Dpa corresponding to the pixel are given.

For example, the shorter the distance from the plane SC of projection to a specific structure (voxel) is, higher brightness, that is, a larger pixel value is given. On the other hand, the longer the distance from the plane SC of projection to the specific structure TB is, lower brightness, that is, a smaller pixel value is given. Concretely, a setting can be made so that tone indicative of brightness changes every predetermined distance, for example, tone indicative of brightness changes only by 10 for the length of one side of a voxel.

The projection distance value Dpa corresponding to each of pixels of a basic image can be expressed by the sum between the reference projection distance value Dst and the difference value ΔD corresponding to the pixel, that is, the following equation (1).

$$Dpa = Dst + \Delta D \quad (1)$$

By giving the reference projection distance value Dst and the difference value ΔD to each of the pixels of a basic image, a state where the projection distance value Dpa is remotely given is obtained. That is, the projection distance value Dpa indicative of a projection distance is given by a function (the equation (1)) using the reference projection distance value Dst as a reference. The pixel value Vc given to each of the pixels of the basic image is set so as to change in accordance with increase/decrease of the projection distance value Dpa according to a change in the reference projection distance value Dst as shown by the function of the projection distance value Dpa, that is, the function using the reference projection distance value Dst as a reference. The setting is made so that the projection distance value Dpa and the pixel value Vc can be properly changed in accordance with a change in the reference projection distance value Dst in order to generate a display image which will be described later.

In such a manner, in step S5, by giving a set of the projection distance value Dpa indicative of projection distance using the reference projection distance value Dst as a reference and the pixel value Vc according to the projection distance value Dpa to each of the pixels of a basic image, a basic image is generated.

In step S5, as shown in FIG. 6B, a position (also referred to as "reference image position") SP2 corresponding to a point on the plane SC of projection on which the reference point SP1 of the specific structure is projected in the basic image SI is recognized, and data for specifying the reference image position SP2 is included in the basic image SI. That is, for a pixel corresponding to the reference image position SP2 out of all of the pixels of the basic image SI, the pixel value Vc, the projection distance value Dpa (actually, the reference projection distance value Dst and the difference value ΔD), and information specifying that the pixel corresponds to the reference image position SP2 are given.

In step S6, by projecting the three-dimensional object TB onto the plane SC of projection, a display image is generated, and the program advances to step S7. When the program advances from step S5 to step S6, the program advances to step S61 in FIG. 3.

In step S61, as shown in FIG. 7, one (for example, a hatched voxel in FIG. 7) of all of voxels constructing a three-dimensional area of the voxel data is designated, and the program advances to step S62. By sequentially designating one of all of the voxels in accordance with a predetermined rule each time the program returns from step S64, all of the voxels are designated finally. Alternatively, only all of voxels constructing a three-dimensional object may be sequentially designated without designating all of voxels constructing a three-dimensional area of the voxel data.

In step S62, the position (also referred to as "reference projection position") in which the reference point of the voxel designated in step S61 is projected onto the plane SC of projection and a distance value (reference projection distance value) Dst1 indicative of the distance (reference projection distance) between the reference point and the reference projection position are detected, and the program advances to step S63.

In step S63, the basic image generated in step S5 is adjusted to the voxel designated in step S61 and adhered to the plane SC of projection, and the program advances to step S64. On the basis of the basic image generated in step S5, by substituting the reference projection distance value Dst1 detected in step S62 to Dst in the equation (1), the projection distance value Dpa and the pixel value Vc of each pixel are adjusted, and a basic image in which the relative positional relation to the plane SC of projection is adjusted (also referred to as "adjusted basic image") is generated so that the reference projection position detected in step S62 and the reference image position of the basic image match each other. The adjusted basic image is adhered to the plane SC of projection.

Figure 8:
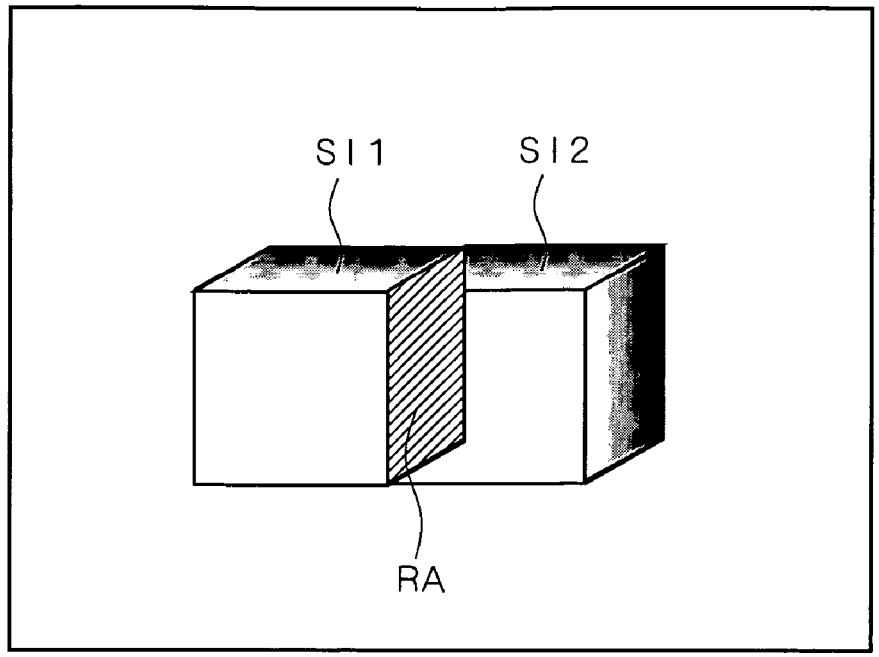
FIG. 8 is a diagram visually showing a phenomenon that basic images are adhered so as to be overlapped after a plurality of adjustments.

The processing flow returns from step S64 which will be described later to step S61, thereby repeating the process of step S63 a plurality of times. By the operation, a plurality of adjusted basic images are combined to each other and, finally, a display image is generated. However, at the time of combining a plurality of adjusted basic images to each other, there is a position (concretely, a pixel corresponding point, also referred to as "projection position") in which a plurality of adjusted basic images overlap in the plane SC of projection. FIG. 8 visually shows a phenomenon that a plurality of adjusted basic images overlap in the plane SC of projection. FIG. 8 shows a hatched area RA in which two adjusted basic images S11 and S12 overlap each other and adhered to the plane SC of projection. For a projection position in which a plurality of adjusted basic images overlap, a set of the projection distance value Dpa indicative of the relatively smallest projection distance and the pixel value Vc corresponding to the projection distance value Dpa is employed preferentially.

Figure 9:
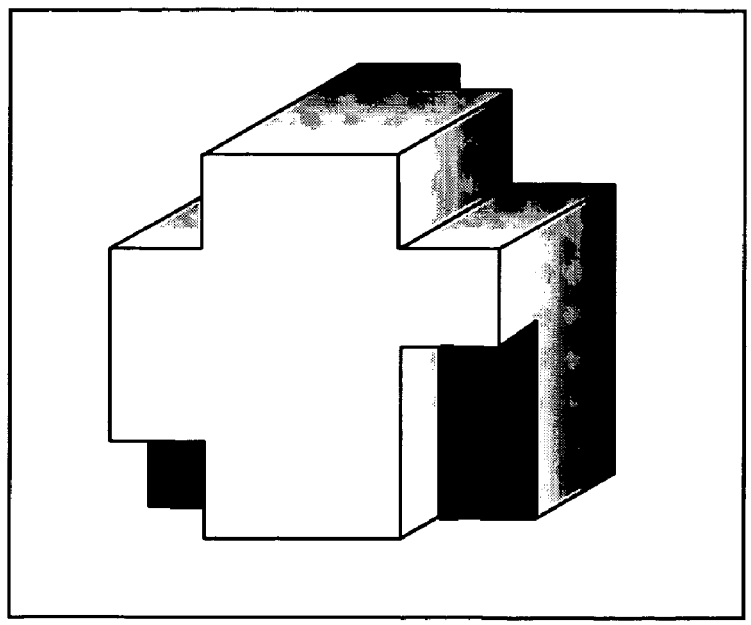
FIG. 9 is a diagram showing an example of a display image.

In step S64, whether all of voxels constructing the three-dimensional area of the voxel data have been designated in step S61 or not is determined. If all of the voxels have not been designated yet, the program returns to step S61. By repeating the processes from step S61 to step S64 until all of the voxels are designated, basic images adjusted in the voxels (adjusted basic image) are adhered to the plane SC of projection. On the other hand, if all of the voxels have been already designated, an image generated by combining the plurality of adjusted basic images is employed as a display image (FIG. 9), the display image generating process is finished, and the program advances to step S7 in FIG. 2.

In step S7, the display image generated in step S6 is output to the monitor 3, and the program advances to step S8. In this case, the display image is output to the monitor 3, and the monitor 3 visibly outputs the display image. That is, an image based on the display image is displayed on the monitor 3.

In step S8, whether an instruction (change instruction) of changing the plane of projection to which a three-dimensional object is projected to perform imaging is given on the basis of an operation on the operation part 4 of the user or not is determined. In the case where an instruction of changing the plane of projection is given, the program returns to step S3, and the processes from step S3 to S8 are performed. On the other hand, when there is no instruction of changing the plane of projection, the determination of step S8 is repeated.

For example, by forcedly finishing the operation flow of imaging volume data in response to an operation on the operation part 4 of the user or the like, the program can forcedly leave the operation flow shown in FIGS. 2 and 3.

As described above, in the image processing system 1 according to the first preferred embodiment, at the time of performing imaging based on voxel data, first, the plane SC of projection on which the three-dimensional object TB is projected is set. By projecting one voxel oriented in a predetermined direction onto the plane SC of projection, the reference image position SP2 corresponding to the reference position SP1 of the voxel and the projection distance (reference projection distance value Dst) between the reference image position SP2 and the reference position SP1 is detected. Data expressing the set of the projection distance value Dpa corresponding to each of the pixel correspondence points of the plane SC of projection and the pixel value Vc by the reference projection distance value Dst is given to each pixel, and a basic image to which data clearly showing the reference image position SP2 is given is generated. Next, at the time of projecting the three-dimensional object TB onto the plane SC of projection, each reference projection position to which the reference position of each voxel is projected and the reference projection distance value Dst1 of each reference position are detected. By combining adjusted basic images generated by adjusting the basic images in accordance with the reference projection position and the reference projection distance value Dst1, a display image is generated. At the time of combining adjusted basic images, for a projection position in which a plurality of adjusted basic images overlap, a set of the projection distance value indicative of the minimum distance and the pixel value corresponding to the projection distance value is preferentially employed.

Specifically, a basic image corresponding to one voxel is preliminarily generated and basic images (adjusted basic images) each adjusted so as to match each voxel are combined to each other, thereby generating a display image. With such a configuration, as compared with a conventional method of determining each of pixel values of a display image while normally projecting each of the voxels and determining the depth relation among voxels, a computation amount since the plane of projection is set until a display image is generated can be largely reduced. As a result, volume data can be imaged at high speed.

Since the pixel value according to the projection distance value Dpa is given to each of the pixels of a display image, a display image according to the distance between the three-dimensional object and the plane SC of projection, that is, a display image whose depth can be visually recognized by the user can be generated.

Second Preferred Embodiment

In the image processing system 1 according to the first preferred embodiment, by directly normally projecting a three-dimensional object onto the plane of projection without generating a map (referred to as a distance map or depth map) showing the distribution of distances between the plane of projection and a three-dimensional object, a display image is generated. In an image processing system 1A according to a second preferred embodiment, when the plane of projection is set, first, a distance map is generated. While using the distance map, a display image is generated by volume rendering using general ray casting or the like.

The image processing system 1A of the second preferred embodiment has a configuration similar to that of the image processing system 1 according to the first preferred embodiment and is different from the image processing system 1 only with respect to an operation of imaging volume data. In imaging of volume data according to the second preferred embodiment, by reducing a computation amount for generating a distance map, reduction in an amount of computing the whole imaging, moreover, high-speed imaging is realized.

In the following, the same reference numerals or characters are given to configurations similar to those of the image processing system 1 according to the first preferred embodiment and their description will not be repeated. An operation flow of generating a distance map as a characteristic point of the second preferred embodiment will be mainly described.

Distance Map Generating Operation

Figure 10:
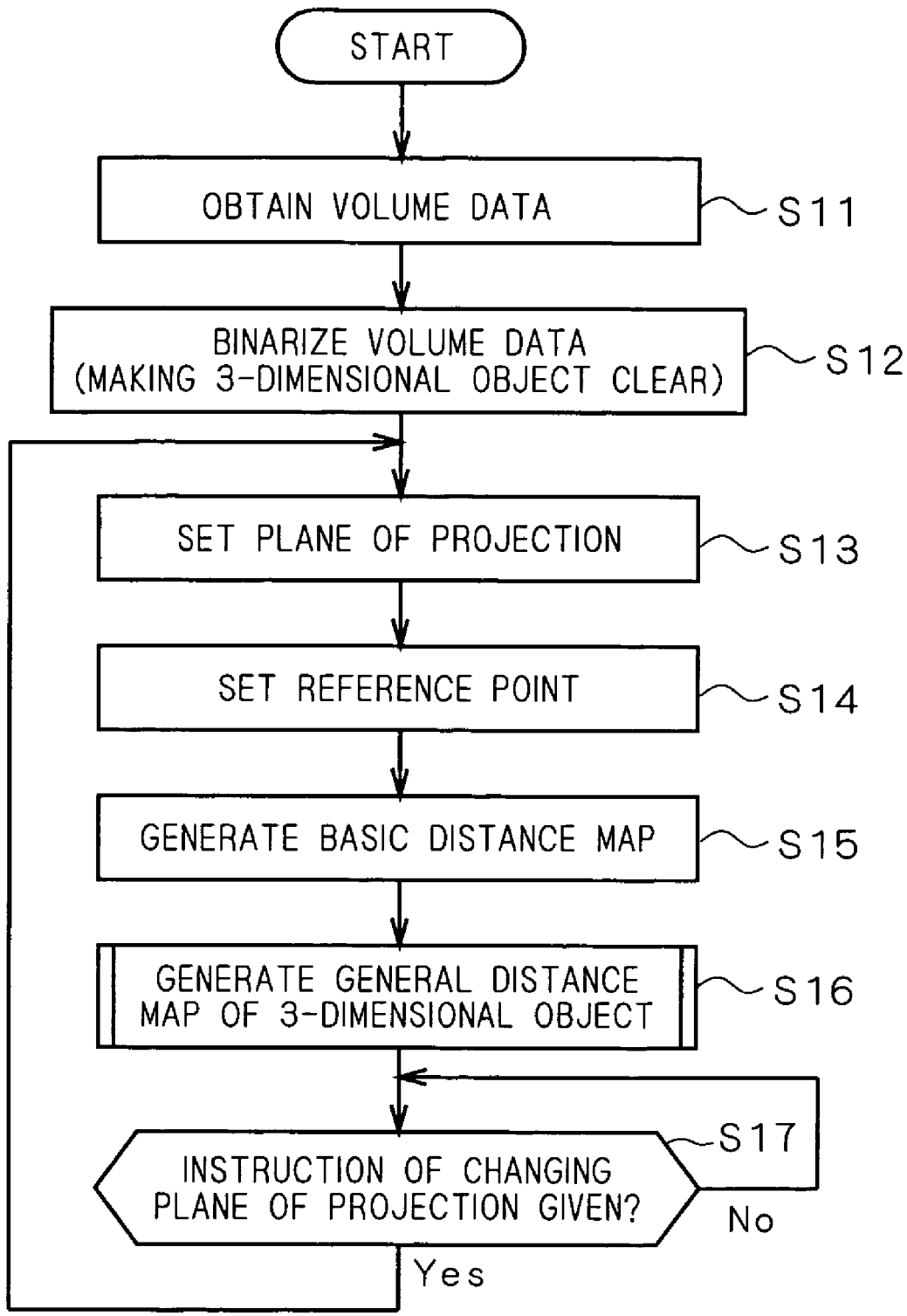
FIG. 10 is a flowchart showing an operation flow of generating a general distance map.
Figure 11:
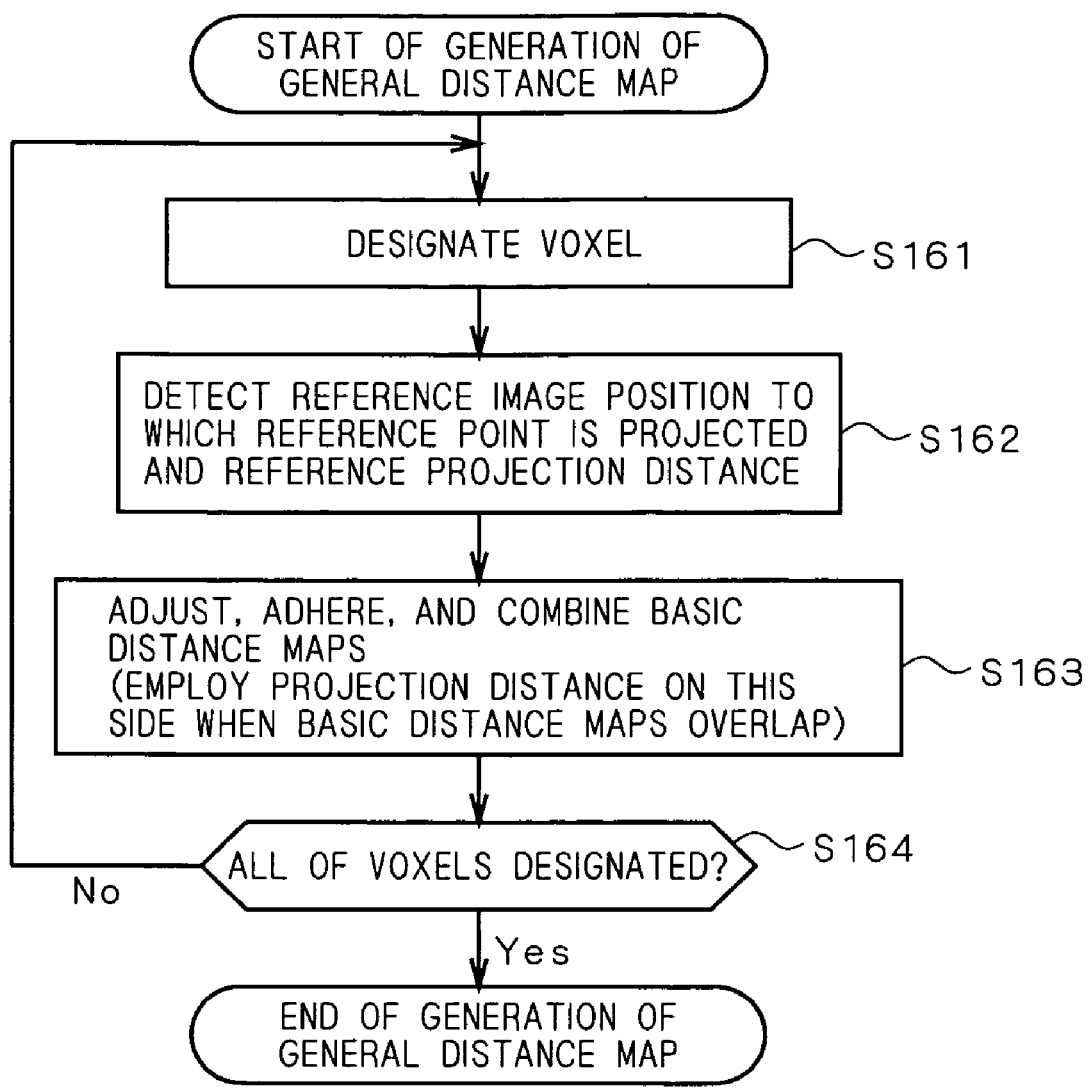
FIG. 11 is a flowchart showing an operation flow of generating a general distance map.

FIGS. 10 and 11 are flowcharts showing a distance map generating operation flow in the image processing system 1A. The operation flow is realized when the controller 20 reads and executes the image processing program PG stored in the storage 22. First, when the user variously operates the operation part 4, imaging of volume data in the image processing system 1A (generation of a display image) starts, and the program advances to step S11 in FIG. 10.

In steps S11 to S14, processes similar to those in steps S1 to S4 in the first preferred embodiment are performed, and the program advances to step S15.

In step S15, a distance map (also referred to as a "basic distance map") indicative of a distribution of distances between one voxel (also referred to as a "model voxel") disposed as a model in accordance with the directional relation between voxels constructing the three-dimensional object and the plane SC of projection and the plane SC of projection set in step S13 is generated, and the program advances to step S16. In step S15, by projecting a model voxel along a number of sight lines set at predetermined intervals and giving data indicative of the distance between the model voxel and the plane of projection to a pixel corresponding to each sight line, a basic distance map is generated.

First, the distance value (reference projection distance value) Dst indicative of the distance (reference projection distance) from the reference point SP1 of a model voxel to the plane SC of projection is detected. Next, the distance value (projection distance value) Dpa indicative of the shortest distance (projection distance) between a model voxel and a pixel corresponding point to which the model voxel is normally projected is detected. Further, for every pixel correspondence point, the difference value ($\Delta D=Dpa-Dst$) between the reference projection distance value Dst and the projection distance value Dpa is calculated. To each of the pixels of the basic distance map, the projection distance value Dpa corresponding to the pixel is given.

The projection distance value Dpa corresponding to each of the pixels in the basic distance map can be expressed by the sum between the reference projection distance value Dst and the difference value $\Delta D$ corresponding to the pixel, that is, the equation (1).

By giving the reference projection distance value Dst and the difference value $\Delta D$ to each of the pixels of the basic distance map, a state where the projection distance value Dpa is indirectly given is obtained. That is, the projection distance value Dpa indicative of the projection distance is given by the function (equation (1)) using the reference projection distance value Dst as a reference so that the projection distance value Dpa can properly change according to a change in the reference projection distance value Dst in order to generate a distance map (also referred to as "general distance map"

described later) indicative of the distribution of the distances between a whole three-dimensional object and the plane SC of projection.

In such a manner, in step S15, the basic distance map indicative of the distribution of the distances between the plane SC of projection and the model voxel using the reference projection distance value Dst as a reference is generated.

Further, in step S15, the position (the reference projection position) in which the reference point SP1 of the voxel is projected to the plane SC of projection is recognized, and data specifying the reference projection position is included in the basic distance map. That is, to the pixel corresponding to the reference projection position out of all of the pixels of the basic distance map, the projection distance value Dpa and information specifying that the pixel corresponds to the reference projection position is given.

In step S16, a general distance map of the whole three-dimensional object is generated, and the program advances to step S17. When the program advances from step S15 to step S16, the program moves to step S161 in FIG. 11.

In step S161, like the step S61 in the first preferred embodiment, one of all of the voxels constructing the three-dimensional region of the voxel data is designated, and the program advances to step S162. By sequentially designating one of all of the voxels in accordance with a predetermined rule each time the program returns from step S164, all of voxels are designated finally.

In step S162, the position (reference projection position) in the plane SC of projection to which the reference point of the voxel designated in step S161 is projected is detected, the distance between the reference point and the plane SC of projection (that is, the reference projection distance value Dst1) is detected, and the program advances to step S163.

In step S163, according to the reference projection position and the reference projection distance value Dst1 detected in step S162, the basic distance map generated in step S15 is adjusted and adhered to the plane SC of projection, and the program advances to step S164. On the basis of the basic distance map generated in step S15, by substituting the reference projection distance value Dst1 detected in step S162 for the equation (1), the projection distance value Dpa of each pixel is adjusted, and a basic distance map (also referred to as "adjusted basic distance map") is generated by adjusting the positional relation relative to the plane SC of projection so that the reference projection position detected in step S162 and the pixel corresponding to the reference projection position in the basic distance map match each other. The adjusted basic distance map is adhered to the plane SC of projection.

When the process flow returns from step S164 which will be described later to step S161, the process of step S163 is repeated a plurality of times. By the processes, a plurality of adjusted basic distance maps are combined to each other and, finally, a general distance map is generated. However, at the time of combining the plurality of adjusted basic distance maps to each other, a position in which the plurality of adjusted basic distance maps overlap (concretely, a pixel corresponding point, in other words, a projection position) occurs in the plane SC of projection. For such a pixel corresponding point, the projection distance value Dpa indicative of the relatively smallest projection distance is preferentially employed.

In step S164, whether all of voxels constructing the three-dimensional area of the voxel data have been designated or not is determined. If all of the voxels have not been designated yet, the program returns to step S161, and the processes from step S161 to step S164 are repeated until all of the voxels are designated, thereby adhering the basic distance map adjusted with respect to each of the voxels (adjusted basic distance map) to the plane SC of projection. On the other hand, when all of the voxels have been already designated, a distance map generated by combining a plurality of adjusted distance maps is employed as a general distance map, the process of generating the general distance map is finished, and the program advances to step S17 in FIG. 10.

In step S17, on the basis of an operation of the operation part 4 by the user, whether an instruction of changing the plane of projection (changing instruction) for forming an image by projecting a three-dimensional object has been given or not is determined. If YES, the program returns to step S13, and the processes from step S13 to step S17 are performed. If NO, the determination in step S17 is repeated.

For example, by forcedly finishing the operation flow of imaging the volume data in accordance with an operation or the like on the operation part 4 by the user, the program can forcedly leave from the operation flow shown in FIGS. 10 and 11.

When the plane SC of projection is set and a general distance map is generated, a display image is generated by the volume rendering using general ray casting or the like while using the general distance map.

As described above, in the image processing system 1A according to the second preferred embodiment, at the time of performing imaging based on voxel data, when the plane SC of projection on which the three-dimensional object TB is projected is set, a general distance map indicative of a distribution of distances between the three-dimensional object TB and the plane SC of projection is generated. At the time of generation of the general distance map, first, the reference projection position corresponding to the reference position SP1 of a model voxel in a predetermined direction and the projection distance (reference projection distance) Dst of the reference position SP1 are detected. A basic distance map in which data expressing the projection distance value Dpa corresponding to a pixel corresponding point by the reference projection distance value Dst is given to the pixel with data clearly indicating a pixel corresponding to the reference projection position is generated. Next, a reference projection position to which the reference position of each voxel in the whole three-dimensional object TB is projected is detected, and the distance (reference projection distance) Dst1 between a reference position and a reference projection position is detected. By combining adjusted basic distance maps each obtained by adjusting the basic distance map in accordance with the reference projection position and the reference projection distance value Dst1 to each other, a general distance map is generated. At the time of combining the adjusted basic distance maps, with respect to a position in which a plurality of adjusted basic distance maps overlap, the projection distance value indicative of the shortest distance is preferentially employed.

Specifically, a basic distance map corresponding to one model voxel is preliminarily generated. By combining basic distance maps (adjusted basic distance maps) adjusted so as to match voxels to each other, a general distance map is generated. With such a configuration, as compared with the conventional method of giving a distance value to each of pixels of the general distance map while performing normal projection and determining the depth relation with respect to each point of each of the voxels, the computation amount since the plane of projection is set until the general distance map is generated can be largely reduced. Therefore, the general distance map can be generated at high speed. As a result, imaging of volume data can be performed at high speed.

Third Preferred Embodiment

In the image processing system 1 according to the first preferred embodiment, when the plane of projection is set at the time of imaging voxel data, one voxel is used as a specific structure, a basic image is generated with respect to the specific structure and, by using the basic image, a display image of the whole three-dimensional object is generated. At the time of imaging the voxel data, one voxel corresponds to a region as the minimum unit of the projecting process.

In contrast, in an image processing system 1B according to a third preferred embodiment, an area in which total eight voxels (generally, specific structures) can be arranged two each in the X, Y, and Z directions is set as an area as the minimum unit of the projecting process (also referred to as "unit process area"). In the unit process areas, a basic image is generated with respect to each of structures in a plurality of patterns constructed by switching the presence or absence of voxels. By using the basic images in the plurality of patterns, a display image of the whole three-dimensional object is generated.

The image processing system 1B according to the third preferred embodiment has a configuration similar to that of the image processing system 1 according to the first preferred embodiment except for an operation of imaging volume data.

Reference numerals and characters similar to those of the first preferred embodiment are designated to configurations similar to those of the image processing system 1 according to the first preferred embodiment, and their description will not be repeated. The operation flow of imaging volume data as a characteristic point of the third preferred embodiment will be mainly described.

Imaging of Volume Data

Figure 12:
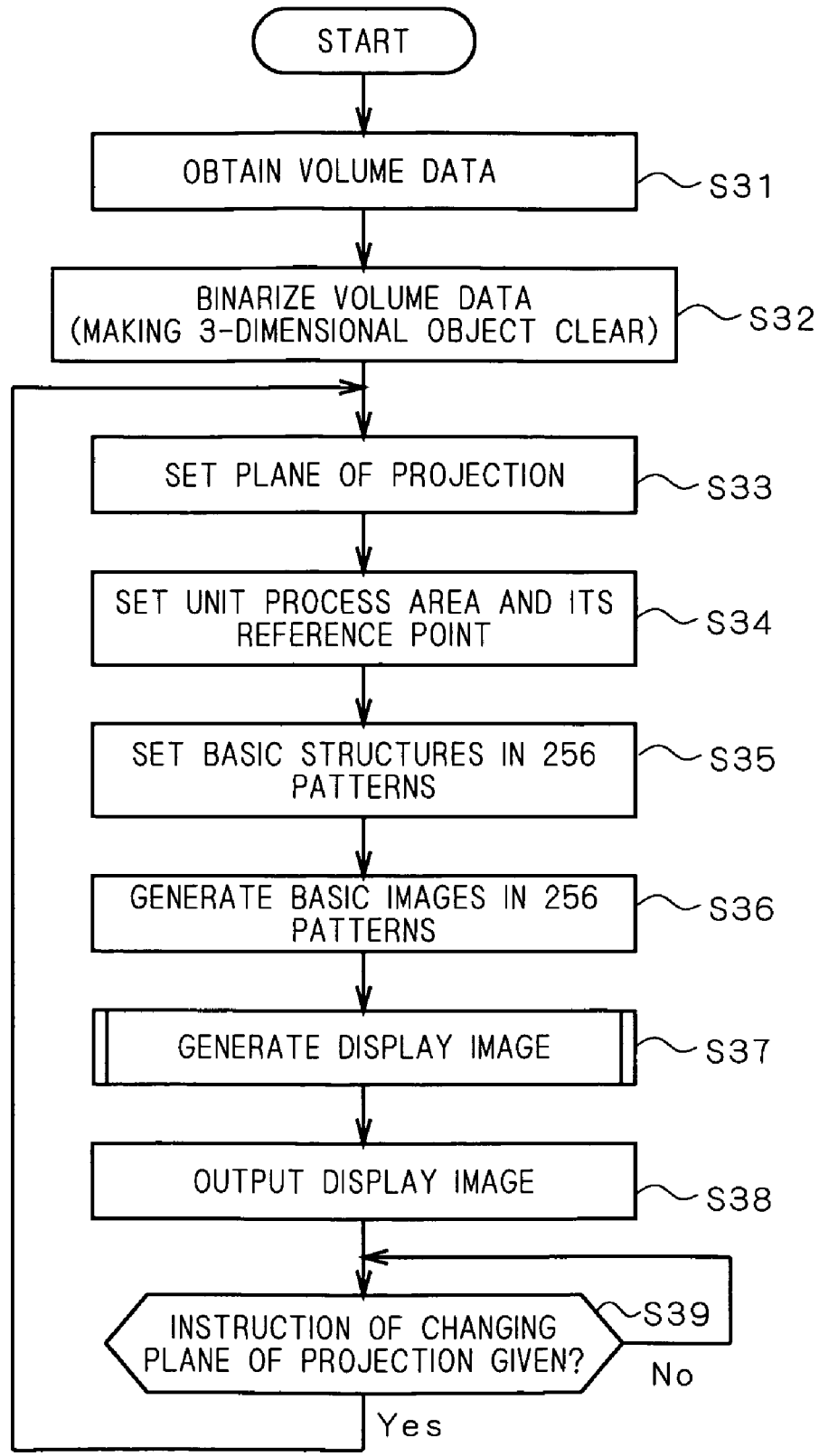
FIG. 12 is a flowchart showing an operation flow of imaging.

FIGS. 12 and 13 are flowcharts showing the operation flow of imaging volume data. The operation flow is realized when the image processing program PG stored in the storage 22 is read and executed by the controller 20. When the user variously operates the operation part 4 to start imaging of volume data (generation of a display image) in the image processing system 1B, the program advances to step S31 in FIG. 12.

In steps S31 to S33, processes similar to those of steps S1 to S3 in the first preferred embodiment are performed, and the program advances to step S34.

In step S34, an area of a cube shape (or rectangular parallelepiped shape) in which voxels indicative of a three-dimensional object can be arranged two each in the X, Y, and Z directions, that is, only total eight voxels of 2 in the X direction×2 in the Y direction×2 in the Z direction can be arranged is set as an area as the minimum unit of the projecting process (unit process area). That is, a three-dimensional area of voxel data is divided into a plurality of unit process areas. A reference point of the unit process area is set, and the program advances to step S35. For example, as shown in FIG. 14A, the center point (point of the center of gravity) of a unit process area (area surrounded by broken lines) MA in which total eight voxels of 2×2×2 can be arranged is set as a reference point (also referred to as "reference position") SP11.

When a combination of the presence and absence of voxels in eight positions in which voxels can be disposed is set for the unit process area, total 256 patterns of voxel arrangements can be considered. In step S35, consequently, a structure (also referred to as "basic structure") constructed by the 256 patterns of voxel arrangements is set, and the program advances to step S36.

Figure 14A:
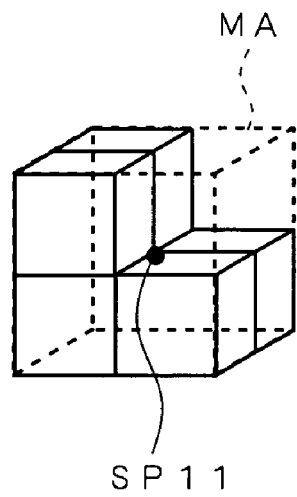
FIG. 14 is a diagram illustrating generation of a basic image.

FIG. 14A shows an example of a basic structure (solid lines) obtained by arranging six voxels in the unit process area (area surrounded by the broken lines) MA. Data specifying the configuration of basic structures of 256 patterns, for example, data generated by giving data indicative of the presence or absence of a voxel to eight positions in which voxels can be arranged (also referred to as "voxel arrangeable positions") is temporarily stored in the RAM 20b or the like. The reference point of the unit process area MA is also handled as the reference point (also referred to as reference position) of the basic structure.

In step S36, image data (basic images) obtained by imaging 256 patterns of basic structures is generated by performing normal projection of the 256 patterns of basic structures formed by switching the presence or absence of voxels in the unit process area onto the plane SC of projection in accordance with the directional relation between three-dimensional object TB and the plane SC of projection, and the program advances to step S36.

By projecting the 256 patterns of basic structures along a number of sight lines, a basic image (FIG. 14B) 2SI constructed by pixels corresponding to the sight lines is generated.

In generation of a basic image in a basic structure, first, the distance value (reference projection distance value) Dst of the distance between the reference point of the basic structure, that is, the reference point SP11 of the unit process area MA and the plane SC of projection, that is, the distance of projecting the reference point SP11 (reference projection distance) is detected. The reference projection distance corresponds to the distance between the reference point SP11 and the position (reference projection position) on the plane SC of projection to which the reference point SP11 is projected.

Next, each distance value (projection distance value) Dpa indicative of the shortest distance (projection distance) between a basic structure and each pixel corresponding point to which the basic structure is normally projected are detected. Further, the difference value ($\Delta D = Dpa - Dst$) between the reference projection distance value Dst and the projection distance value Dpa is calculated for each pixel corresponding point.

Like step S5 in the first preferred embodiment, to each of the pixels of a basic image, the projection distance value Dpa corresponding to the pixel and the pixel value Vc according to the projection distance value Dpa corresponding to the pixel are given.

In step S36, by giving a set of the projection distance value Dpa indicative of a projection distance using the reference projection distance value Dst and the pixel value Vc according to the projection distance value Dpa to each of pixels of a basic image, a basic image of a basic structure constructed by a plurality of patterns is generated.

Figure 14B:
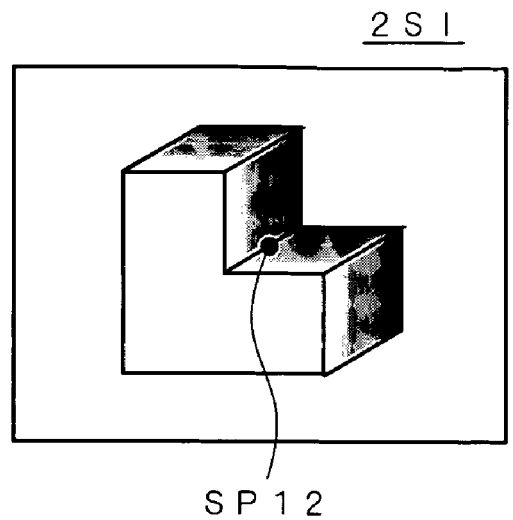

Further, in step S36, as shown in FIG. 14B, a position (reference image position) SP12 of an image corresponding to a point on the plane SC of projection on which the reference point SP11 of the basic structure is projected in the basic image 2S1 is recognized, and data for specifying the reference image position SP12 is also included in the basic image. That is, for a pixel corresponding to the reference image position SP12 out of all of the pixels of the basic image 2SI, the pixel value Vc, the projection distance value Dpa (actually, the reference projection distance value Dst and the difference value $\Delta D$), and information specifying that the pixel corresponds to the reference image position SP12 are given.

The basic images in the 256 patterns generated are temporarily stored as a database (also referred to as "basic image DB") in the RAM 20b, the storage 22, or the like.

In step S37, by projecting the three-dimensional object TB onto the plane SC of projection, a display image is generated, and the program advances to step S38. When the program advances from step S36 to step S37, the program moves to step S371 in FIG. 13.

Figure 15:
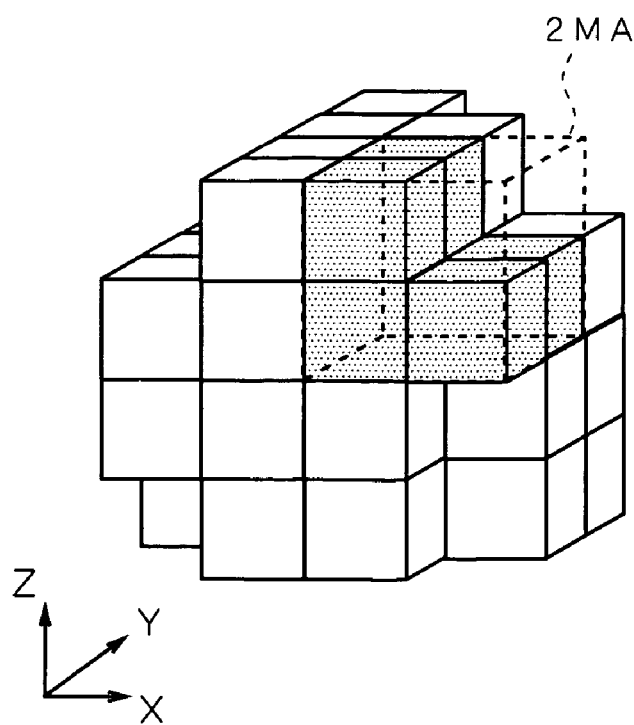
FIG. 15 is a diagram illustrating designation of a unit area to be subjected to a unit process.

In step S371, as shown in FIG. 15, one unit process area (for example, unit process area surrounded by broken lines in FIG. 15) 2MA of all of unit process areas constructing the three-dimensional region of the voxel data is designated, and the program advances to step S372. By sequentially designating one of all of the unit process areas in accordance with a predetermined rule each time the program returns from step S375, all of the unit process areas are designated finally. Alternatively, without sequentially designating all of unit process areas constructing the three-dimensional area of voxel data, only unit process areas including voxels constructing a three-dimensional object may be sequentially designated.

In step S372, the basic structure corresponding to the unit process area designated in step S371 is detected out of the basic structures of 256 patterns set in step S35, a basic image corresponding to the basic structure is detected, and the program advances to step S373.

By extracting a basic structure matching a combination of the presence and absence of voxels in the unit process area designated in step S371 from combinations of the presence and absence of voxels of the basic structures of 256 patterns stored in the RAM 20b, a basic structure corresponding to the unit process area designated in step S371 is detected. From the basic images DB stored in the RAM 20b or the storage 22, a basic image corresponding to the detected basic structure is extracted.

In step S373, the position (reference projection position) to which the reference point of the unit process area designated in step S371 is projected and the distance (reference projection distance value) Dst1 between the reference point and the reference projection position are detected, and the program advances to step S374.

In step S374, the basic image extracted in step S372 is adjusted to the unit process area designated in step S371 and adhered to the plane SC of projection, and the program advances to step S375. On the basis of the basic image extracted in step S372, by substituting the reference projection distance value Dst1 detected in step S373 to Dst in the equation (1), the projection distance value Dpa and the pixel value Vc of each pixel are adjusted, and a basic image in which the relative positional relation to the plane SC of projection is adjusted (also referred to as "adjusted basic image") is generated so that the reference projection position detected in step S373 and the reference image position of the basic image match each other. The adjusted basic image is adhered to the plane SC of projection.

The processing flow returns from step S375 which will be described later to step S371, thereby repeating the process of step S374 a plurality of times. By the operation, a plurality of adjusted basic images are combined to each other and, finally, a display image is generated. However, at the time of combining a plurality of adjusted basic images to each other, there is a position (concretely, a pixel corresponding point, in other words, projection position) in which a plurality of adjusted basic images overlap in the plane SC of projection. For a projection position in which a plurality of adjusted basic images overlap, a set of the projection distance value Dpa indicative of the relatively smallest projection distance and the pixel value Vc corresponding to the projection distance value Dpa is employed preferentially.

In step S375, whether all of unit process areas constructing the three-dimensional area of the voxel data have been designated in step S371 or not is determined. If all of the unit process areas have not been designated yet, the program returns to step S371. By repeating the processes from step S371 to step S375 until all of the unit process areas are designated, basic images adjusted in the unit process areas (adjusted basic images) are adhered to the plane SC of projection. On the other hand, if all of the unit process areas have been already designated, an image generated by combining the plurality of adjusted basic images is employed as a display image (refer to, for example, FIG. 9), the display image generating process is finished, and the program advances to step S38 in FIG. 12.

In step S38, the display image generated in step S37 is output to the monitor 3, and the program advances to step S39. In this case, the display image is output to the monitor 3, and the monitor 3 visibly outputs the display image. That is, an image based on the display image is displayed on the monitor 3.

In step S39, whether an instruction (change instruction) of changing the plane of projection to which a three-dimensional object is projected to perform imaging is given on the basis of an operation on the operation part 4 of the user or not is determined. In the case where an instruction of changing the plane of projection is given, the program returns to step S33, and the processes from step S33 to step S39 are performed. On the other hand, when there is no instruction of changing the plane of projection, the determination of step S39 is repeated.

For example, by forcedly finishing the operation flow of imaging volume data in response to an operation on the operation part 4 of the user or the like, the program can forcedly leave the operation flow shown in FIGS. 12 and 13.

As described above, in the image processing system 1B according to the third preferred embodiment, at the time of performing imaging based on voxel data, first, the plane SC of projection on which the three-dimensional object TB is to be projected is set. For a unit process area in which total eight voxels oriented in predetermined directions, specifically, two each in the X, Y, and Z directions can be arranged, basic structures of 256 patterns are set by combinations of the presence and absence of the voxels in the eight positions in which the voxels can be disposed. The reference image position SP12 corresponding to the reference position SP11 of the unit process area is detected, and the projection distance (reference projection distance) Dst of the reference position SP11 is detected. Further, for each of the basic structures of the 256 patterns, data expressing a set of the projection distance value Dpa corresponding to a pixel corresponding point and the pixel value Vc by the reference projection distance value Dst is given to each pixel, and a basic image to which data clearly indicating the reference image position SP12 is given are generated.

Next, at the time of projecting the three-dimensional object TB onto the plane SC of projection, the basic structure and the basic image corresponding to each unit process area are detected, and each reference projection position to which the reference position of each unit process area is projected and each distance value (reference projection distance value) Dst1 between each reference position and each reference projection position are detected. By combining adjusted basic images generated by adjusting the basic images in accordance with each reference projection position and each reference projection distance value Dst1, a display image is generated. At the time of combining adjusted basic images, for a pixel corresponding point in which a plurality of adjusted basic images overlap, a set of the projection distance value indicative of the minimum distance and the pixel value corresponding to the projection distance value is preferentially employed.

Specifically, basic structures of 256 patterns obtained by combining the presence and absence of voxels with respect to the unit process area in which eight voxels can be disposed are preliminarily set, a basic image of each of the basic structures is preliminarily generated, and basic images (adjusted basic images) each adjusted with respect to each unit process area in accordance with the reference projection position and the reference projection distance value are combined, thereby generating a display image. With such a configuration, as compared with a conventional method of determining each of pixel values of a display image while normally projecting each of the voxels and determining the depth relation among voxels, a computation amount since the plane of projection is set until a display image is generated can be largely reduced. As a result, volume data can be imaged at high speed.

Since the pixel value according to the projection distance value Dpa is given to each of the pixels of a display image, a display image according to the distance between the three-dimensional object and the plane SC of projection, that is, a display image whose depth can be visually recognized by the user can be generated.

Fourth Preferred Embodiment

In the image processing system 1B according to the third preferred embodiment, by directly normally projecting a three-dimensional object onto the plane of projection without generating a map (referred to as a distance map or depth map) showing the distribution of distances between the plane of projection and a three-dimensional object, a display image is generated. In an image processing system 1C according to a fourth preferred embodiment, when the plane of projection is set, a distance map is generated. While using the distance map, a display image is generated by volume rendering using general ray casting or the like.

The image processing system 1C of the fourth preferred embodiment has a configuration similar to that of the image processing system 1B according to the third preferred embodiment and is different from the image processing system 1B only with respect to an operation of imaging volume data. In imaging of volume data according to the fourth preferred embodiment, by reducing a computation amount for generating a distance map, reduction in an amount of computing the whole imaging, moreover, high-speed imaging is realized.

In the following, the same reference numerals or characters are given to configurations similar to those of the image processing system 1B according to the third preferred embodiment and their description will not be repeated. An operation flow of generating a distance map as a characteristic point of the fourth preferred embodiment will be mainly described.

Distance Map Generating Operation

Figure 16:
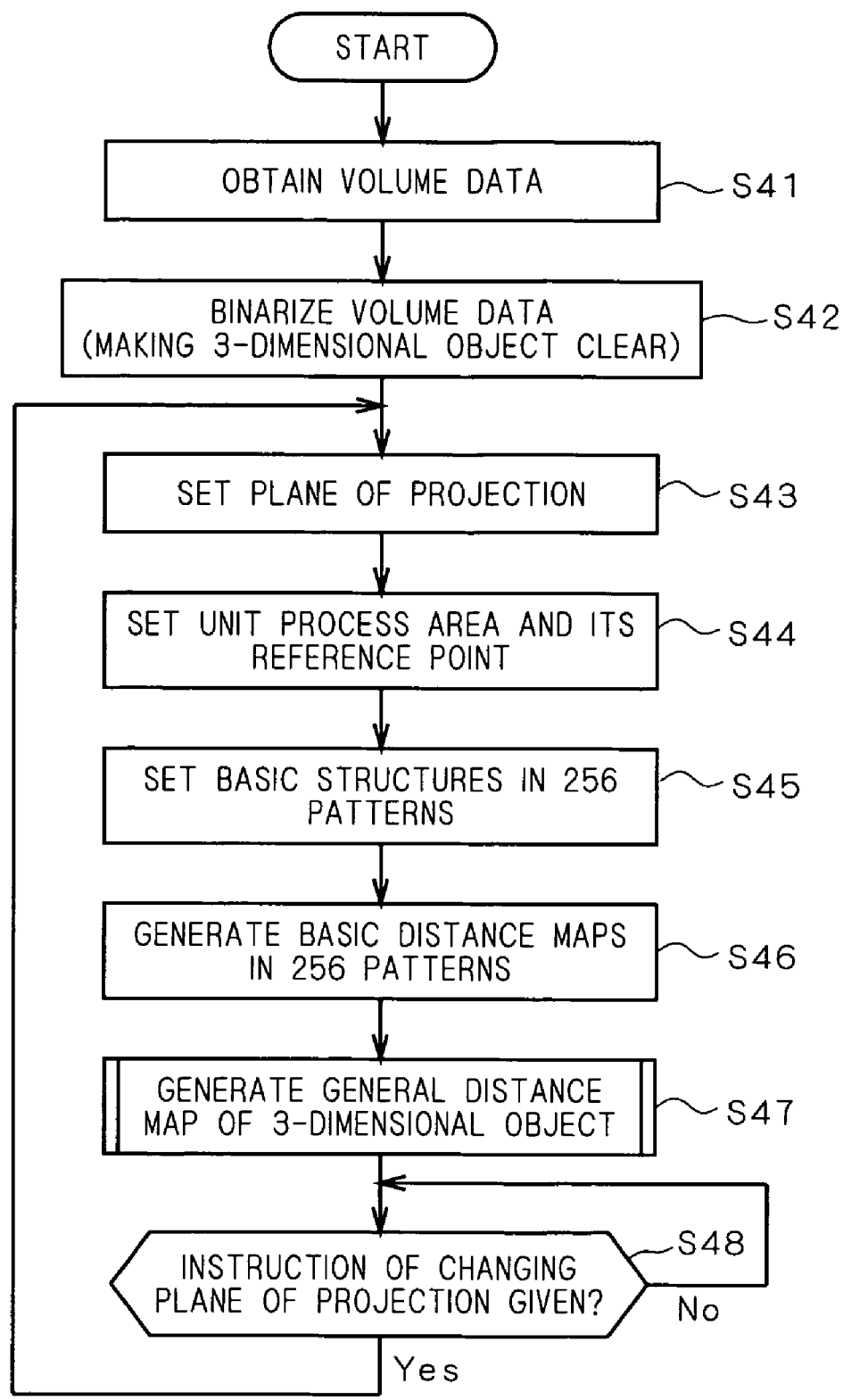
FIG. 16 is a flowchart showing an operation flow of generating a general distance map.
Figure 17:
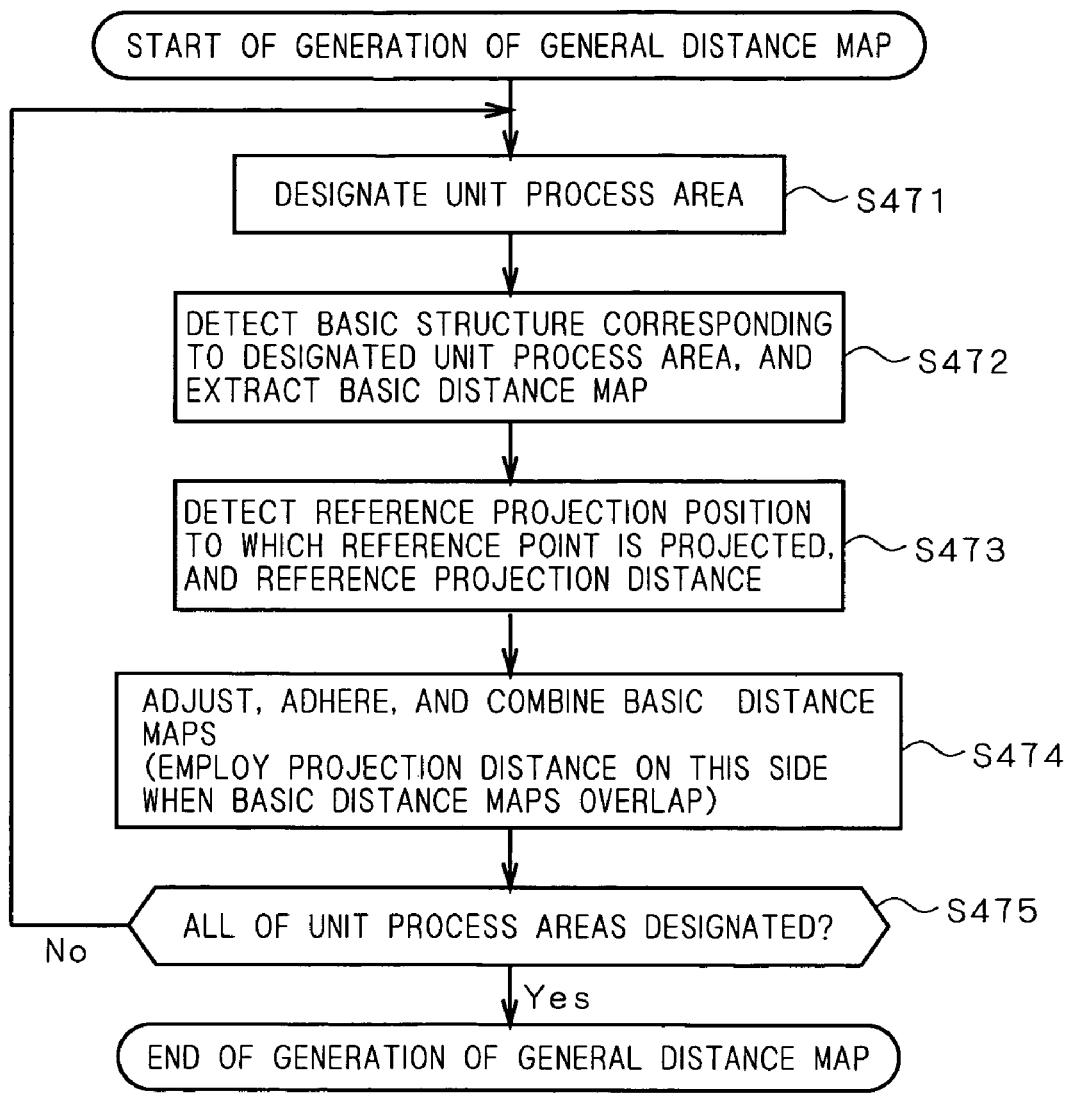
FIG. 17 is a flowchart showing an operation flow of generating a general distance map.

FIGS. 16 and 17 are flowcharts showing a distance map generating operation flow in the image processing system 1C. The operation flow is realized when the controller 20 reads and executes the image processing program PG stored in the storage 22. First, when the user variously operates the operation part 4, imaging of volume data in the image processing system 1C (generation of a display image) starts, and the program advances to step S41 in FIG. 16.

In steps S41 to S45, processes similar to those in steps S31 to S35 in the third preferred embodiment are performed, and the program advances to step S46.

In step S46, a distance map (basic distance map) indicative of a distribution of distances between a basic structure (also referred to as a "model basic structure") disposed as a model and the plane SC of projection set in step S43 is generated for each of the basic structures of 256 patterns in accordance with the relative directional relation between voxels constructing the three-dimensional object and the plane SC of projection, and the program advances to step S47.

In step S46, by projecting a model basic structure along a number of sight lines set at predetermined intervals and giving data indicative of the distance between the model basic structure and the plane of projection to a pixel corresponding to each sight line, basic distance maps of 256 patterns corresponding to the basic structures of 256 patterns are generated. In the preferred embodiment as well, the reference point of the unit process area MA is used as the reference point of the basic structure.

First, the distance value (reference projection distance value) Dst indicative of the distance (reference projection distance) from the reference point SP1 of a model basic structure to the plane SC of projection is detected. Next, the distance value (projection distance value) Dpa indicative of the shortest distance (projection distance) between the model basic structure and a pixel corresponding point to which the model basic structure is normally projected is detected. Further, for every pixel corresponding point, the difference value (ΔD=Dpa−Dst) between the reference projection distance value Dst and the projection distance value Dpa is calculated. To each of the pixels of the basic distance map, the projection distance value Dpa corresponding to the pixel is given.

The projection distance value Dpa corresponding to each of the pixels in the basic distance map can be expressed by the sum between the reference projection distance value Dst and the difference value ΔD corresponding to the pixel, that is, the equation (1).

By giving the reference projection distance value Dst and the difference value ΔD to each of the pixels of the basic distance map, a state where the projection distance value Dpa is indirectly given is obtained. That is, the projection distance value Dpa indicative of the projection distance is given by the function (equation (1)) using the reference projection distance value Dst as a reference so that the projection distance value Dpa can properly change according to a change in the reference projection distance value Dst in order to generate a distance map (also referred to as "general distance map") indicative of the distribution of the distances between a whole three-dimensional object which will be described later and the plane SC of projection.

Further, in step S46, the position (reference projection position) in which the reference point SP1 of the unit process area is projected to the plane SC of projection in the basic distance map is recognized, and data specifying a pixel corresponding to the reference projection position is also included in the basic distance map. That is, to the pixel corresponding to the reference projection position out of all of the pixels of the basic distance map, the projection distance value Dpa (actually, the reference projection distance value Dst and the difference value ΔD) and information specifying that the pixel corresponds to the reference projection position are given.

The basic distance maps in the 256 patterns generated in the preferred embodiment are temporarily stored as a database (also referred to as "basic distance map DB") in the RAM 20b, the storage 22, or the like.

In step S47, a general distance map of the whole three-dimensional object is generated, and the program advances to step S48. When the program advances from step S46 to step S47, the program moves to step S471 in FIG. 17.

In step S471, like the step S371 in the third preferred embodiment, one of all of the unit process areas constructing the three-dimensional region of the voxel data is designated, and the program advances to step S472.

In step S472, the basic structure corresponding to the unit process area designated in step S471 is detected from the basic structures of 256 patterns set in step S45, and the basic distance pattern corresponding to the basic structure is extracted from the basic distance map DB stored in the RAM 20b or the like. After that, the program advances to step S473.

In step S473, the position (reference projection position) in the plane SC of projection to which the reference point of the unit process area designated in step S471 is projected and the distance (reference projection distance value) Dst1 between the reference point and the reference projection position are detected, and the program advances to step S474.

In step S474, the basic distance map extracted in step S472 is adhered to the plane SC of projection by using the reference projection position detected in step S473 as a reference, and the program advances to step S475. On the basis of the basic distance map extracted in step S472, by substituting the reference projection distance value Dst1 detected in step S473 for the equation (1), the projection distance value Dpa of each pixel is adjusted, and a basic distance map (adjusted basic distance map) is generated by adjusting the positional relation relative to the plane SC of projection so that the reference projection position detected in step S473 and the pixel corresponding to the reference projection position in the basic distance map match each other. The adjusted basic distance map is adhered to the plane SC of projection.

When the process flow returns from step S475 which will be described later to step S471, the process of step S474 is repeated a plurality of times. By the processes, a plurality of adjusted basic distance maps are combined to each other and, finally, a general distance map is generated. However, at the time of combining the plurality of adjusted basic distance maps to each other, a position in which the plurality of adjusted basic distance maps overlap (concretely, a pixel corresponding point, in other words, a projection position) occurs in the plane SC of projection. For such a pixel corresponding point, the projection distance value Dpa indicative of the relatively smallest projection distance is preferentially employed.

In step S475, whether all of unit process areas constructing the three-dimensional area of the voxel data have been designated or not is determined. If all of the unit process areas have not been designated yet, the program returns to step S471, and the processes from step S471 to step S475 are repeated until all of the unit process areas are designated, thereby adhering the basic distance map adjusted with respect to each of the unit process areas (adjusted basic distance map) to the plane SC of projection. On the other hand, when all of the unit process areas have been already designated, a distance map generated by combining a plurality of adjusted distance maps is employed as a general distance map, the process of generating the general distance map is finished, and the program advances to step S48 in FIG. 16.

In step S48, on the basis of an operation of the operation part 4 by the user, whether an instruction (changing instruction) of changing the plane of projection for forming an image by projecting a three-dimensional object has been given or not is determined. If YES, the program returns to step S43, and the processes from step S43 to step S48 are performed. If NO, the determination in step S48 is repeated.

For example, by forcedly finishing the operation flow of imaging the volume data in accordance with an operation or the like on the operation part 4 by the user, the program can forcedly leave from the operation flow shown in FIGS. 16 and 17. When the plane SC of projection is set and a general distance map is generated, a display image is generated by the volume rendering using general ray casting or the like while using the general distance map.

As described above, in the image processing system 1C according to the fourth preferred embodiment, at the time of performing imaging based on voxel data, when the plane SC of projection on which the three-dimensional object TB is to be projected is set, a general distance map indicative of a distribution of distances between the three-dimensional object TB and the plane SC of projection is generated. At the time of generating the general distance map, first, the basic structures in 256 patterns are set by combinations of the presence and absence of voxels in eight positions in which voxels can be disposed in the unit process area in which eight voxels oriented in predetermined directions of two each in the X, Y, and Z directions can be disposed. The reference projection position corresponding to the reference position SP11 of the unit process area and the projection distance (reference projection distance) Dst of the reference position SP11 are detected. Further, for each of the basic structures of 256 patterns, a basic distance map in which data expressing the projection distance value Dpa corresponding to a pixel corresponding point by the reference projection distance value Dst is given to each pixel and data clearly indicating a pixel corresponding to the reference projection position is given is generated.

Next, the basic structure corresponding to each unit process area of the whole three-dimensional object TB is detected, and the basic distance map corresponding to the basic structure is extracted. A reference projection position to which the reference position of each unit process area is projected is detected, and the distance (reference projection distance) Dst1 between a reference position and a reference projection position is detected. Further, by combining adjusted basic distance maps each obtained by adjusting the basic distance map in accordance with the reference projection position and the reference projection distance value Dst1 to each other, a general distance map is generated. At the time of combining the adjusted basic distance maps, with respect to a position in which a plurality of adjusted basic distance maps overlap, the projection distance value indicative of the shortest distance is preferentially employed.

Specifically, basic structures of 256 patterns obtained by combining the presence and absence of voxels are pre-set for the unit process area in which eight voxels can be arranged, and basic distance maps for the basic structures are preliminarily generated. By combining the basic distance maps (adjusted basic distance maps) to each other, which are adjusted in accordance with the distance to the plane SC of projection and the positional relation relative to the plane SC of projection with respect to the unit process areas, a general distance map is generated. With such a configuration, as compared with the conventional method of giving a distance value to each of pixels of the general distance map while performing normal projection and determining the depth relation with respect to each point of each of the voxels, the computation amount since the plane of projection is set until the general distance map is generated can be largely reduced. Therefore, the general distance map can be generated at high speed. As a result, imaging of volume data can be performed at high speed.

Fifth Preferred Embodiment

An image processing system 1D according to a fifth preferred embodiment will now be described. The image processing system 1D according to the fifth preferred embodiment has a configuration similar to that of the image processing system 1 according to the first preferred embodiment and is different from the image processing system 1 only with respect to an operation of imaging volume data. In the following, the same reference numerals or characters are given to configurations similar to those of the image processing system 1 according to the first preferred embodiment and their description will not be repeated.

In volume rendering in the image processing system 1D according to the fifth preferred embodiment, first, octree data showing the shape of an object of volume rendering, that is, a three-dimensional object is generated on the basis of volume data (an octree data generating method will be described later). When a plane of projection to which a three-dimensional object is projected is set, a distribution (depth map) of distances between the three-dimensional object and the plane of projection is generated by using the octree data. Further, by using the depth map, for example, a process by ray casting is performed. As shown in Table 1, so-called hybrid-type volume rendering is performed, which has: a process (object order process) for generating a depth map by sequentially calculating the distance to the plane of projection by using the three-dimensional object side as a reference by using the octree data; and a process (image order process) by ray casting, for performing sampling in a sight line direction from the plane of projection side in which a display image or the like is generated in data by using the depth map.

TABLE 1

| Object order process | Process for generating depth map by using octree data |
|---|---|
| Image order process | Process by ray casting using depth map |

Generation of octree data

An octree data generating method based on volume data, carried out in the image processing system 1D is a generally well known method and will be briefly described.

A three-dimensional area corresponding to the volume data, that is, a predetermined cubic space (hereinafter, also referred to as block) in which the three-dimensional object exists is set as an object to be processed. First, the predetermined cubic space is divided into two portions in each of the vertical and horizontal directions, that is, divided into total eight blocks. Whether a portion constructing a three-dimensional object exits or not is determined with respect to each of the divided eight blocks. A block generally occupied by a three-dimensional object is employed as it is. A block in which no three-dimensional object exists is not employed. A block partially occupied by a three-dimensional object is divided into eight portions as described above, and similar determination is repeated. Whether a three-dimensional object exits or not is determined by how a voxel value in a predetermined value range corresponding to a three-dimensional object to be processed exists in a block to be determined.

According to a preset limit number of dividing times or a division level (also referred to as "division hierarchical level"), whether final octree data becomes three-dimensional data in which the shape of the three-dimensional object is reflected more specifically or not is determined.

In this specification, it is expressed that the more the shape of the three-dimensional object is specifically reflected in the octree data, the higher the resolution of the octree data is. The less the shape of the three-dimensional object is specifically reflected in the octree data, the lower the resolution of the octree data is. Therefore, the division hierarchical level can be used as a parameter specifying the resolution of octree data as data (three-dimensional data) indicative of a three-dimensional structure generated on the basis of volume data. In other words, the division hierarchical level is used as a parameter determining resolution of octree data.

When the block is divided by the maximum number of dividing times determined by the division hierarchical level, a block in which a three-dimensional object exists but which is not generally occupied by the three-dimensional object may be generated. Such a block is employed as it is and included in the structure expressed by the octree data.

In such a manner, octree data constructed by a plurality of blocks roughly expressing the shape of the three-dimensional object is generated on the basis of the volume data.

Figure 18:
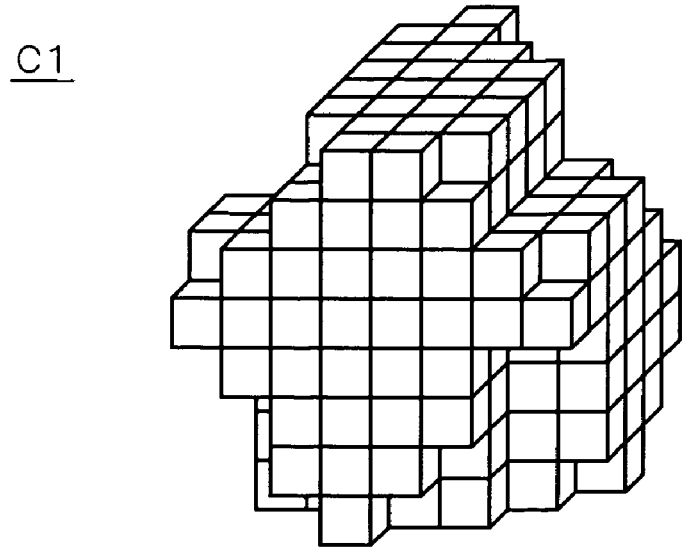
FIG. 18 is a diagram illustrating octree data of a three-dimensional object.
Figure 19:
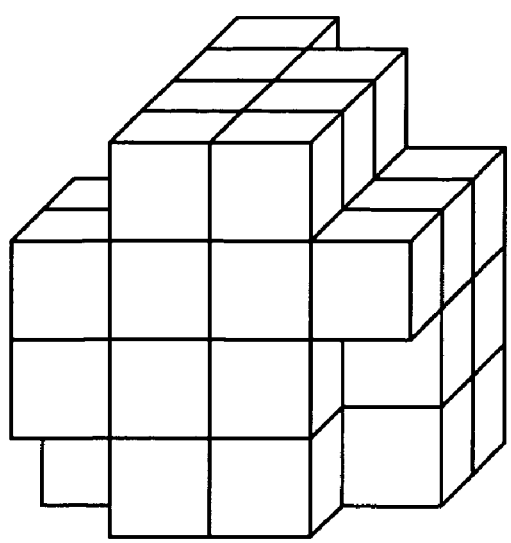
FIG. 19 is a diagram illustrating octree data of a three-dimensional object.

FIGS. 18 and 19 are perspective views of structures obtained by visibly showing octree data generated from a three-dimensional object. FIG. 18 is a perspective view of a structure C1 obtained by visibly showing octree data generated when the division hierarchical level is set to N+1 (where N denotes a predetermined natural number). FIG. 19 is a perspective view of a structure C2 obtained by visibly showing octree data generated when the division hierarchical level is set to N.

In reality, a structure of octree data tends to include blocks of different sizes since the block dividing number in a portion corresponding to the inside of a three-dimensional object and that in a peripheral portion are different from each other. For convenience, each of the structures C1 and C2 shown in FIGS. 18 and 19 is shown as a set of blocks (hereinafter, also referred to as "cells") obtained by dividing all of blocks to the size of the minimum blocks.

As shown in FIGS. 18 and 19, the peripheral portion of the three-dimensional object in the structure C1 having the division hierarchical level relatively higher by one (one level) is shown more specifically than that in the structure C2 having the division hierarchical level relatively lower by one (one level).

Object Order Process

Generation of a depth map using the octree data generated as described above, that is, the object order process will now be described.

When the plane of projection to which a three-dimensional object is to be projected is set, the structure of octree data of the three-dimensional object is projected to the plane of projection, thereby generating a depth map. For example, by projecting the structures C1 and C2 shown in FIGS. 18 and 19, a depth map is generated.

Concretely, for example, when the structure C1 is set as an object, the cells constructing the structure C1 are sequentially designated and projected onto the plane of projection. When one cell is designated, the distance (distance value) between the surface of the cell facing the plane of projection and a point (also referred to as "pixel corresponding point") corresponding to a pixel in a display image finally generated on the plane of projection is detected and given to the pixel corresponding point. When the cells are sequentially designated and a plurality of distance values are detected with respect to the same pixel corresponding point, the distance value on the shortest distance side is employed. After all of the cells are designated, a state where the distance values corresponding to the whole structure C1 are given to the pixel corresponding points is obtained. That is, a depth map of the structure C1 as a three-dimensional object is generated. The depth map is, for example, data in which the position coordinates of each pixel corresponding point and the corresponding distance value are associated with each other.

FIGS. 20 and 21 show depth maps DM1 and DM2 corresponding to the structures C1 and C2 shown in FIGS. 18 and 19, respectively. FIGS. 20 and 21 show the depth maps DM1 and DM2 whose density becomes lower as the distance value given to the pixel corresponding point decreases.

As shown in FIGS. 20 and 21, when the division hierarchical level is relatively high, the depth map DM1 which is relatively specific is generated.

Image order process

Figure 22:
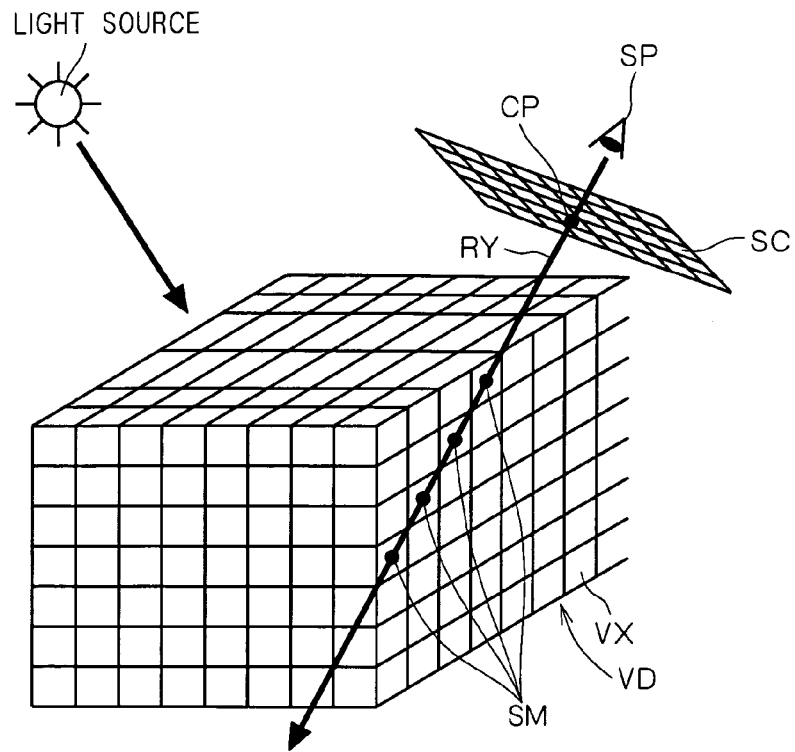
FIG. 22 is a diagram illustrating volume rendering by ray casting.
Figure 23:
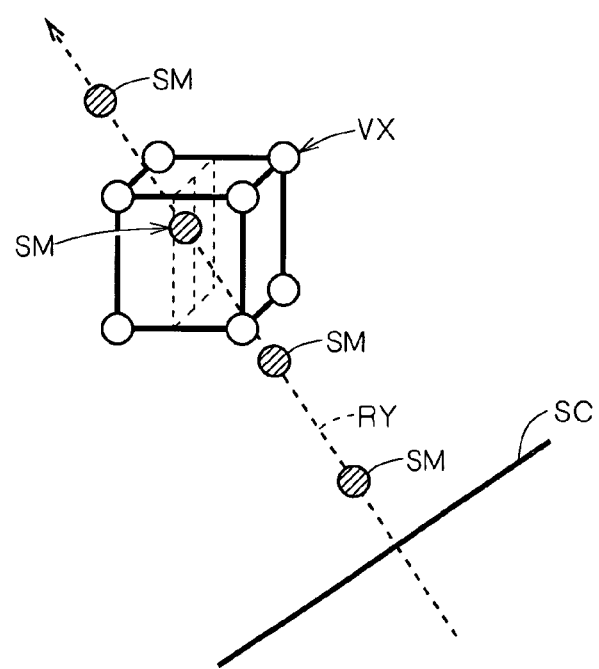
FIG. 23 is a diagram illustrating volume rendering by the ray casting.

FIGS. 22 and 23 are conceptual diagrams illustrating volume rendering by ray casting, that is, an image order process.

In the volume rendering by ray casting, for example, as shown in FIG. 22, voxel data VD distributed in a three-dimensional space is sampled at sampling points SM at predetermined intervals along a ray (also referred to as sight line) RY emitted from an arbitrary viewpoint SP via a predetermined point CP on the plane SC of projection. By adding the sampling values, a semi-transparent display image is generated finally. Each of the points CP on the plane SC of projection is a pixel corresponding point corresponding to a pixel in the display image finally generated. A pixel whose pixel value is to be calculated among the pixels on the display image is also referred to as a "target pixel". In the volume rendering, by displaying a semi-transparent image, the inside of an object can be visually displayed. This is realized by giving opacity α to each voxel VX.

In the volume rendering by ray casting, the product between the brightness value and the opacity α of a voxel is sequentially added up from the viewpoint SP side along the ray RY. When the sum of α becomes 1 or when the ray RY goes out from the target volume, a process on the target pixel (the pixel corresponding point CP corresponding to the target pixel) is finished. A result of the addition is employed as the value of the target pixel (pixel value).

The brightness value and opacity at the present sampling point are set to "c" and α, respectively. The relation between an integrated brightness value Cin of light incident on the sampling points lined along a sight line and an integrated brightness value Cout of light after the sampling point is expressed as the following equation (2).

$$C_{out} = C_{in}(1-\alpha) + C\alpha \quad (2)$$

As shown in FIG. 23, the brightness value and the opacity at the sampling point (hatched circles in FIG. 23) SM in ray casting are obtained by linear interpolation from the brightness values and opacities of eight adjacent voxels.

Figure 24:
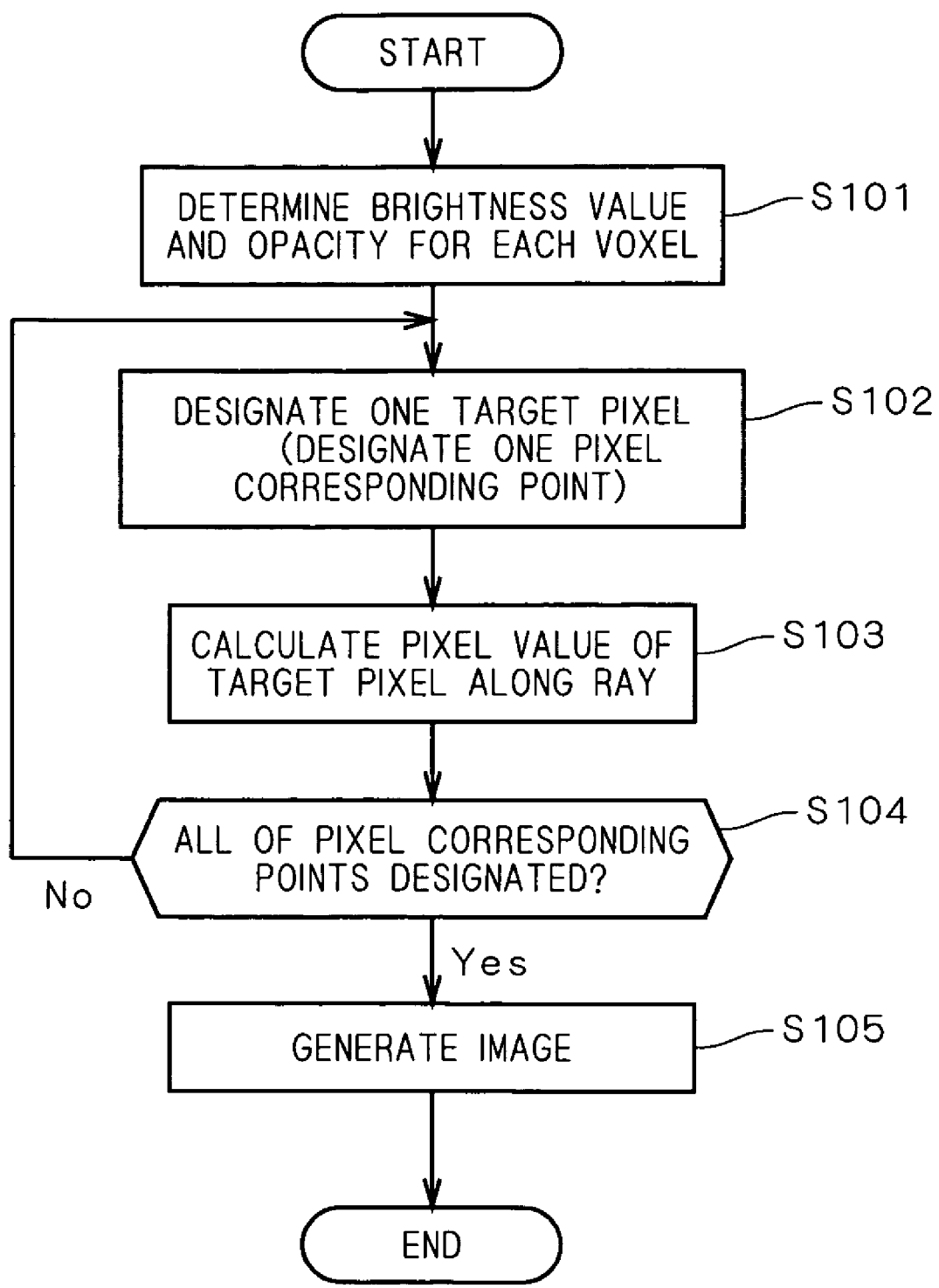
FIG. 24 is a flowchart showing a general operation flow of volume rendering by the ray casting.

FIG. 24 is a flowchart showing the operation flow of the image order process. It is assumed that, before the object order process starts, volume data stored in the memory card 5 1, the storage 22, or the like is read and obtained by the controller 20 and is temporarily stored in the RAM 20b. Subsequent to the object order process, the operation flow of the image order process shown in FIG. 24 starts.

After the operation flow of the image order process starts, first, the brightness value and opacity of each voxel are determined (step S101). By adding products between the brightness values and opacities along a ray from the pixel corresponding point on the plane of projection, a final pixel value of each of the target pixels is obtained and one image (such as display image) is generated (steps S102 to S105).

Sampling is performed along each of rays. At the time of adding the products each between the brightness value and the opacity, the start point of sampling is determined by using a depth map. This is known in so-called hybrid-type volume rendering. Concretely, since a rough distance value from each of the pixel corresponding points to the three-dimensional object is given in the depth map, by referring to the depth map, how far the point where a three-dimensional object exists is from the plane SC of projection can be recognized for each ray. Therefore, to prevent useless sampling process and computation from being performed in a position where no three-dimensional object exists, by referring to the depth map, sampling can be performed from the point of the corresponding distance value or larger for each ray. Further, by referring to the depth map, a state where no three-dimensional object exists on a ray can be also recognized. Consequently, a ray which does not have to be sampled can be also detected, and useless sampling can be omitted more.

A method of calculating the brightness value "c" and the opacity α of each voxel will be described.

The brightness value "c" of each voxel is calculated by the following equation (3) from the Phong's shading model using a normal vector N estimated from the gradient of neighboring voxel values.

$$c = c_p k_a + \frac{c_p}{k_1 + k_2 d}[k_d(N \cdot L) + k_s(N \cdot H)] \quad (3)$$

where $c_p$ denotes light source intensity, and $k_a$, $k_d$, and $k_s$ indicate the ratios of environmental light, diffusion light, and mirror reflection light components, respectively. "d" denotes the distance from the plane of projection to a voxel, and $k_1$ and $k_2$ denote parameters of depth coding which increases the intensity of light with increasing proximity to the plane of projection. L denotes a unit direction vector from a voxel toward the light source, and H indicates a vector for obtaining normal reflection light and is obtained by the following equation (4) using the sight line direction vector V indicative of the direction of the ray.

$$H=(V+L)/|V+L| \quad (4)$$

The normal vector N of a voxel value f(i, j, k) is obtained by the following equation (5). The voxel value f(i, j, k) indicates a voxel value in the coordinates of x=i, y=j, and z=k in the case where a three-dimensional space is expressed by a three-dimensional rectangular coordinate system of x, y, and z.

$$N=\nabla f(i,j,k)/|\nabla f(i,j,k)| \quad (5)$$

$\nabla f(i, j, k)$ is expressed by the following equation (6) as gradients in the x, y, and z directions of the voxel value.

$$\nabla f(i,j,k)=[(f(i+1,j,k)-f(i-1,j,k)),(f(i,j+1,k)-f(i,j-1,k)),(f(i,j,k+1)-f(i,j,k-1))] \quad (6)$$

In the case where a display image obtained by the rendering is obtained as a color image, by executing similar calculations using the equations (3) to (6) for each of the components of R (red), G (green), and B (blue) of the light source, pixel values of R, G, and B for each target pixel can be derived.

In the equations (3) to (6), the light source intensity $c_p$, the ratio $k_a$ of the environmental light component, the ratio $k_d$ of the diffusion light component, the ratio $k_s$ of the mirror reflection light component, and the parameters $k_1$ and $k_2$ of the depth coding are set to proper values by the user. The unit direction vector L is obtained by the positional relation between setting of the position of the light source and a voxel. The sight line direction vector V indicative of the direction of the ray is obtained by setting of the position of the visual point SP. Therefore, all of the values in the right side of the equation (3) are determined, so that the brightness value "c" of each voxel can be calculated.

On the other hand, the opacity α can be calculated by the following equation (7).

$$\alpha = \alpha_{n+1}(f - f_n)/(f_{n+1} - f_n) + \alpha_n(f_{n+1} + f)/(f_{n+1} - f_n) \qquad (7)$$

f(i, j, k) is simply indicated as "f", $f_n$ indicates the minimum voxel value in the range of voxel values to which opacity is desired to be given, and $f_{n+1}$ indicates the maximum voxel value in the range of voxel values to which opacity is desired to be given. $\alpha_n$ indicates opacity when the voxel value is $f_n$, and $\alpha_{n+1}$ indicates opacity when the voxel value is $f_{n+1}$. Further, opacity is computed by the equation (7) when the relation of $f_n < f < f_{n+1}$ is satisfied. When the relation of $f_n < f < f_{n+1}$ is not satisfied, α is set to zero (α=0).

Relation Between Division Hierarchical Level and Calculation Cost

On assumption that a division level (division hierarchical level) at the time of generating octree data on the basis of volume data is used as a parameter and the parameter is changed, the relations among the size of the parameter and the calculation costs in the object order process and the image order process are shown in Table 2.

TABLE 2

| Parameter (division hierarchical level) | Object order process | Image order process |
| --- | --- | --- |
| Large | Calculation cost (calculation time) High (long) | Calculation cost (calculation time) Low (short) |
| Small | Calculation cost (calculation time) Low (short) | Calculation cost (calculation time) High (long) |

As shown in Table 2, when the division hierarchical level becomes relatively high, as shown in FIG. 18, the size of each cell is relatively small, and the number of cells becomes relatively large. In the object order process, the surface area of the surface of a cell facing the plane of projection increases, so that the computation amount of projection for generating a depth map increases, and the calculation time (also referred to as calculation cost) increases. On the other hand, when the division hierarchical level becomes relatively high, as shown in FIG. 20, the relatively finer depth map DM1 is generated. Consequently, by referring to the depth map DM1, whether a three-dimensional object exists or not around the outer edge of the three-dimensional object can be more specifically recognized. As a result, useless sampling can be reduced, so that calculation time (calculation cost) of the image order process can be reduced.

On the other hand, when the division hierarchical level becomes relatively low, as shown in FIG. 19, the size of each cell becomes relatively large, and the number of cells becomes relatively small. In the object order process, the computation amount of projection for generating a depth map decreases only by the amount corresponding to the reduced number of cells, and the calculation time (calculation cost) decreases. On the other hand, when the division hierarchical level becomes relatively low, as shown in FIG. 21, the relatively rougher depth map DM2 (with lower precision) is generated. Consequently, by referring to the depth map DM2, whether a three-dimensional object exists or not around the outer edge of the three-dimensional object cannot be more specifically recognized. As a result, useless sampling becomes relatively large, so that calculation time (calculation cost) of the image order process increase.

As described above, the division hierarchical level exerts an influence on the process ratio between the image order process and the object order process in the volume rendering, and serves as a parameter by which the process ratio is influenced. The balance between the calculation cost of the object order process and that of the image order process can be properly changed by the parameter called the division hierarchical level used at the time of generating octree data. However, the calculation cost of the object order process and that of the calculation cost are influenced by the shape of a three-dimensional object to be processed and the hardware configuration for the image process.

As for the influence of the shape of a three-dimensional object, when a three-dimensional object to be processed has a very simple shape such as a ball shape, even if a depth map with low precision is used, the degree of increase in the calculation cost of the image order process tends to be relatively low. In such a case, by making the division hierarchical level relatively low, total calculation cost obtained by totaling the calculation cost of the object order process and the calculation cost of the image order process can be suppressed.

On the other hand, when a three-dimensional object to be processed has a very complicated shape like branches of a tree, if a depth map with low precision is used, calculation for useless sampling increases, and the calculation cost of the image order process tends to become very high. In such a case, by making the division hierarchical level relatively higher, the total calculation cost can be suppressed.

As for the influence of the hardware configuration, for example, so-called primary and second cache memories exist in the RAM 20b in the controller 20, and the capacity of the primary cache memory is limited to a certain size. Consequently, as the division hierarchy level becomes higher, the structure of the octree data becomes complicated, the capacity of octree data increases, and the octree data cannot be stored in the primary cache. At this time, octree data has to be stored also to the secondary cache. It is known that, however, time necessary for the CPU to read data from the secondary cache is much longer than that necessary for the CPU to read data from the primary cache. Therefore, in a state where the division hierarchical level is high and octree data is stored also in the secondary cache, time required to read octree data increases in the object order process, so that calculation cost of the object order process and total calculation cost tend to increase.

Consequently, at the time of performing volume rendering of the hybrid type, the division hierarchical level necessary to suppress the total calculation cost varies according to the conditions such as the shape of a three-dimensional object to be processed, the hardware configuration of a memory or the like, and so on.

In the image processing system 1D according to the preferred embodiment of the present invention, when a three-dimensional object to be processed is determined, while changing the division hierarchical level step by step, the volume rendering of the hybrid type is performed. The division hierarchical level at which the calculation cost becomes the lowest is set as a preferable division hierarchical level for the three-dimensional object. In such a manner, the division hierarchical level is adjusted. After that, by performing the volume rendering using octree data according to the set division hierarchical level in accordance with a change in the sight line direction, that is, a change in the plane of projection, a display image can be smoothly changed.

The adjustment of the division hierarchical level will be described below.

Adjustment of Division Hierarchical Level

Figure 25:
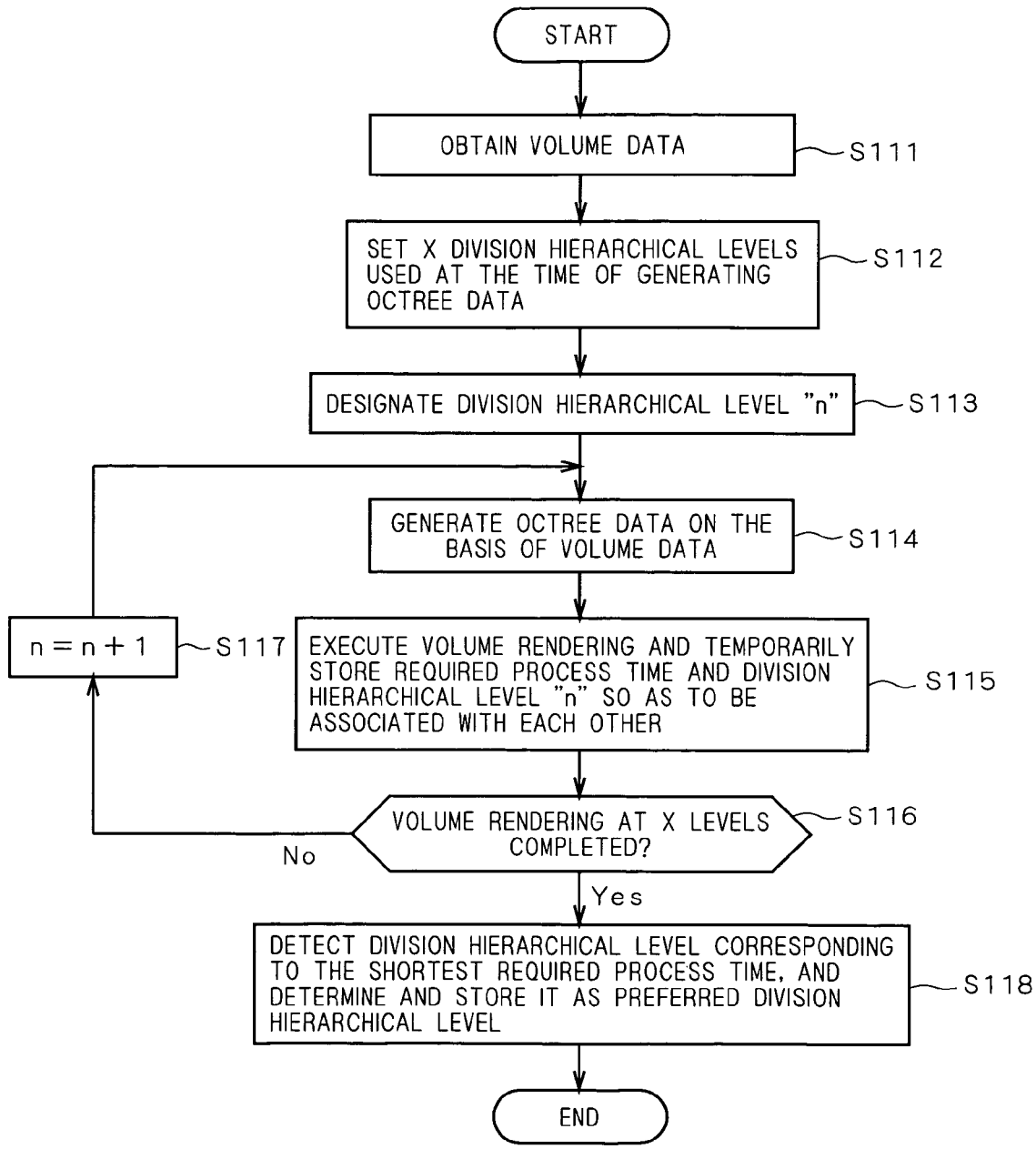
FIG. 25 is a flowchart showing the flow of adjusting a divided hierarchical level.

FIG. 25 is a flowchart showing the flow of adjustment of the division hierarchical level. The adjustment flow is realized when the controller 20 reads the image processing program PG stored in the storage 22 and executes it by the CPU. For example, when the user variously operates the operation part 4 to designate volume data to be subjected to volume rendering, the program advances to step S111 in FIG. 25.

In step S111, volume data in a three-dimensional area to be processed, stored in the memory card 51, the storage 22, or the like is read and obtained by the controller 20. The read volume data is loaded and temporarily stored in the RAM 20b functioning as storing means, and the program advances to step S112. At this time, a pre-process such as a filter process for eliminating noise may be performed on the volume data by the controller 20.

In step S112, X division hierarchical levels (X denotes a natural number of 2 or larger) used at the time of generating octree data on the basis of the volume data are set, and the program advances to step S113. For example, six division hierarchical levels of 5 to 10 can be set. The division hierarchical levels may be preliminarily determined in the image processing program PG or can be properly determined according to various operations on the operation part 4 by the user.

In step S113, the smallest division hierarchical level "n" in the division hierarchical levels set in step S112 is designated, and the program advances to step S114.

In step S114, according to the division hierarchical level designated in step S113, octree data is generated on the basis of the volume data obtained in step S111, and the program advances to step S115. The generated octree data is temporarily stored in the RAM 20b.

In step S115, volume rendering is executed, time required for the volume rendering process (also referred to as "required process time") is measured and temporarily stored in the RAM 20b so as to be associated with the division hierarchical level "n" designated in step S113, and the program advances to step S116.

In step S116, whether volume rendering has been completed or not is determined with respect to all of the X division hierarchical levels set in step S112. If NO, the program advances to step S117. If YES, the program advances to step S118.

In step S117, the division hierarchical level "n" designated in step S113 is increased only by one, and the program returns to step S114. For example, when the program advances to step S117 in a state where 5 is designated as the division hierarchical level, the division hierarchical level is set to 6. In such a manner, under control of the controller 20, the division hierarchical level is set to a value which varies step by step.

Therefore, by repeating the processes in steps S114 to S117, the volume rendering is executed with respect to all of the X division hierarchical levels, and the program advances to step S118. By repeating the process of step S115 X times, the required process time necessary for volume rendering based on the volume data is measured at each of the set X division hierarchical levels which vary step by step. In the RAM 20b, the X division hierarchical levels which vary step by step and X required process times corresponding to the division hierarchical levels which vary step by step are temporarily stored so as to be associated with each other.

When the process of step S114 is performed the second or subsequent times, data used for generating octree data in the process of step S114 of last time is stored in the RAM 20b, the storage 22, or the like. By using the data, while sequentially dividing the blocks as the division hierarchical level increases, the existence state of a three-dimensional object is determined. In such a manner, desired octree data can be generated.

In step S118, the shortest required process time is extracted from the X required process times stored in the RAM 20b, and the division hierarchical level corresponding to (or stored so as to be associated with) the shortest required process time is detected. The detected division hierarchical level is determined as a preferable division hierarchical level and stored in the RAM 20b.

FIG. 26 is a diagram in which the relation between the division hierarchical level and the required process time (total calculation cost) is expressed by a curve Cv. In step S118, as shown in FIG. 26, a division hierarchical level Aj corresponding to the shortest required process time is detected from the required process times.

Since the preferable division hierarchical level determined here is the most preferable division hierarchical level from the viewpoint of reducing the total calculation cost in results of actual computing processes, it will be also called "the division hierarchical level that is optimum in computation".

When the division hierarchical level that is optimum in calculation is determined in such a manner, the adjustment of the division hierarchical level completes, and the adjustment flow shown in FIG. 25 is finished.

Each time the plane of projection is changed after that, octree data is generated according to the division hierarchical level that is optimum in calculation and adjusted in the adjustment flow, and the volume rendering is performed, thereby generating a display image.

As described above, in the image processing system 1D according to the fifth preferred embodiment, the division hierarchical level as a parameter exerting an influence on the process ratio between the image order process and the object order process in the volume rendering of the hybrid type is set to a value which varies step by step. In a state where the division hierarchical level is set to a value which varies step by step, octree data according to the division hierarchical level is generated on the basis of volume data of a three-dimensional area to be processed. Further, the process time required for volume rendering based on volume data is measured at each of the different division hierarchical levels, and the division hierarchical level corresponding to the shortest process time is determined as the division hierarchical level which is the optimum in computation. With such a configuration, octree data is generated according to the determined division hierarchical level that is optimum in calculation. After that, volume rendering of generating a display image can be performed on the three-dimensional object to be processed while properly changing the sight line direction (the plane of projection). As a result, generation of display images can be executed in shorter time. That is, a display image displayed on the monitor 3 can be switched in short time, and a smooth change in the display image can be realized.

The parameter exerting an influence on the process ratio between the image order process and the object order process in volume rendering corresponds to resolution of octree data generated on the basis of volume data. Consequently, from the viewpoint of enabling generation of a display image to be executed in shorter time, the resolution of three-dimensional data can be set to a preferable level (relatively preferable level).

Modifications

Although the preferred embodiments of the present invention have been described above, the present invention is not limited to the above description.

For example, in the first and third preferred embodiments, a pixel value corresponding to the smallest projection distance value is preferentially employed for a portion in which a plurality of adjusted basic images overlap at the time of adhering adjusted basic images to the plane SC of projection, thereby displaying a display image whose depth can be visually recognized by the user. The present invention is not limited to the preferred embodiments. For example, in the case where, at the time of generating a basic image, the reference projection distance value and the projection distance value are not detected and a uniform pixel value is given to pixel corresponding points to which a voxel or basic structure is projected in a plane of projection, at the time of adhering adjusted basic images to the plane SC of projection, the resultant pixel values of the adjusted basic images employed with respect to the portion in which a plurality of adjusted basic images overlap are the same. Consequently, it is sufficient to simply combine a plurality of adjusted basic images to generate a display image without considering the projection distance value and the like.

In such a configuration, the display image whose depth cannot be visually recognized by the user is generated. However, as compared with the conventional method of performing normal projection to each of voxels and determining each of pixel values of a display image, the computation amount since the plane of projection is set until a display image is generated can be largely reduced. That is, imaging of volume data can be performed at high speed.

Although there is no description in the first and third preferred embodiments on colors properly given to a basic image, a display image, and the like, for example, it is possible to binarize a voxel value, at the time of generating a set of voxels expressing a three-dimensional object, express changes in the pixel values according to the projection distances by changes in brightness so as to give attributes by which color varies in accordance with the range of voxel values to the voxels, and give pixel values according to the attributes of the colors given to the voxels at the time of projecting the voxels to the plane of projection. With such a configuration, in the case where a three-dimensional object is constructed by a plurality of parts, display images in colors which vary according to the kinds of the parts can be generated.

In the first to fourth preferred embodiments, a basic image and a basic distance map are generated for a voxel or a unit process area, and a process is performed on the voxels having the same size and unit process areas including the voxels and having the same size in a three-dimensional object, thereby generating a display image and a general distance map. The present invention however is not limited to the preferred embodiments. For example, even when a three-dimensional object is constructed by specific structures each having a shape similar to a voxel but having a size different from the voxel or a three-dimensional object is constructed by areas to be processed each having a shape similar to that of a unit process area but having a size different from the unit process area, the size of a basic image and a basic distance map is multiplied by a constant in accordance with the ratio between the size of the specific structure and the size of the voxel or the ratio between the size of the area to be processed and the size of the unit process area, and the resultant basic image and the resultant basic distance map are adhered to the plane of projection. In such a manner, a display image and a general distance map can be generated.

In the third and fourth preferred embodiments, total eight voxels of 2×2×2 voxels can be arranged in the unit process area. The present invention is not limited to the preferred embodiments but, for example, total two voxels of 2×1×1 voxels can be also arranged. When the number of voxels which can be arranged in the unit process area changes, the number of combinations of the presence and absence of a voxel, that is, the number of patterns of the basic structures also changes. Consequently, it is obvious that basic images and basic distance maps of the number according to the number of patterns of the basis structure have to be generated.

In the third preferred embodiment, basic images in 256 patterns are generated. For the generation, the method in the first preferred embodiment can be also employed. Concretely, a method of generating a basic image for one voxel and generating basic images in 256 patterns by using the basic image may be also employed. With such a configuration, a calculation amount at the time of generating basic images in 256 patterns is reduced, so that imaging of volume data can be performed at higher speed.

Similarly, the basic distance maps in 256 patterns are generated in the fourth preferred embodiment. At the time of the generation, the method of the second preferred embodiment may be also employed. Concretely, a method of generating a basic distance map for one voxel and generating basic distance maps in 256 patterns by using the basic distance map may be also employed. With such a configuration, a calculation amount at the time of generating basic distance maps in 256 patterns is reduced, so that imaging of volume data can be performed at higher speed.

In the first to fourth preferred embodiments, the specific structure is a voxel having a cubic shape or a rectangular parallelepiped shape. The shape is not limited to those shapes but may be other shapes such as a regular tetrahedron.

In the fifth preferred embodiment, the division hierarchical level that is optimum in calculation is determined for one three-dimensional object. The present invention is not limited to the preferred embodiment. It is also possible to determine a division hierarchical level that is optimum in calculation for each of two or more three-dimensional objects, generate a database in which the three-dimensional objects and corresponding division hierarchical levels that are optimum in calculation are associated with each other and, at the time of performing volume rendering on a three-dimensional area including the two or more three-dimensional objects, perform computing process in accordance with the division hierarchical level that is optimum in calculation for each of the three-dimensional objects with reference to the database. Alternatively, information indicative of each of the three-dimensional objects and the division hierarchical level that is optimum in calculation corresponding to the objects may be given as attribute information to volume data of the three-dimensional objects.

With such a configuration, generation of a display image in a three-dimensional area including a plurality of three-dimensional objects can be executed in shorter time.

Although the division hierarchical level that is optimum in calculation is obtained by changing the division hierarchical level only by six levels in the fifth preferred embodiment, the present invention is not limited to the preferred embodiment. For example, By measuring required calculation times for a plurality of (such as three or larger) different division hierarchical levels, the division hierarchical level that is optimum in computation may be obtained. From the viewpoint of execution of generation of a display image in shorter time, however, the larger the number of division hierarchical levels to be changed is, the more optimum division hierarchical level can be obtained.

In the fifth preferred embodiment, when volume data is read, first, while changing the division hierarchical level step by step, octree data is generated, and the division hierarchical level that is optimum in calculation is obtained. Consequently, time required to generate a display image on the basis of volume data for the first time is long. However, since the capacity of the volume data is large, relatively long time is required to read the volume data. Therefore, the time for obtaining the division hierarchical level that is optimum in calculation in the beginning is not so noticeable for the user.

While the invention has been shown and described in detail, the foregoing description is in all aspects illustrative and not restrictive. It is therefore understood that numerous modifications and variations can be devised without departing from the scope of the invention.

What is claimed is:

1. An image processing device for generating a display image on the basis of three-dimensional data, comprising:
    a reader for reading and storing three-dimensional data indicative of a structure of a virtual three-dimensional object constructed by a set of specific structures oriented in a predetermined direction into a predetermined storage;
    a projection plane setter for setting a directional relationship between a virtual plane of projection on which said virtual three-dimensional object is projected and said virtual three-dimensional object;
    a reference position setter for setting a reference position of a specific structure included in said set of specific structures;
    a basic image generator for generating a basic image by projecting said specific structure oriented in said predetermined direction onto said virtual plane of projection in accordance with said directional relationship and, also, recognizing a reference image position corresponding to said reference position in said basic image;
    a detector for detecting each of reference projection positions in which said reference position of each specific structure included in said set of specific structures is projected to said virtual plane of projection at a time of projecting said virtual three-dimensional object onto said virtual plane of projection;
    an adjusted image generator for generating adjusted basic images on the basis of said basic image by adjusting a positional relationship between said basic image and said virtual plane of projection in accordance with said each of reference projection positions detected by said detector; and
    a display image generator for generating a display image by combining said adjusted basic images to each other
    wherein said basic image generator detects a reference projection position corresponding to said reference position of said specific structure and a reference projection distance as a distance between said reference position and said reference projection position, detects each of projection distances as distances between predetermined points on said virtual plane of projection and said specific structure, and gives a set of a projection distance value of said each of projection distances using said reference projection distance as a reference and a pixel value according to said each of projection distances to each of pixels of said basic image respectively, thereby generating said basic image,
    said detector also detects each of reference projection distances corresponding to said each of reference projection positions,
    said adjusted image generator adjusts each said positional relationship, each said projection distance value and each said pixel value in accordance with said each of reference projection positions and said each of reference projection distances detected by said detector on the basis of said basic image as a base, thereby generating said adjusted basic images, and
    said display image generator employs a set of a projection distance value indicative of a minimum projection distance and a pixel value corresponding to said minimum projection distance for a projection position in which a plurality of said adjusted basic images overlap in said virtual plane of projection at a time of combining said adjusted basic images to each other.

2. An image processing device for generating a display image on the basis of three-dimensional data, comprising:
    a reader for reading and storing three-dimensional data indicative of a structure of a virtual three-dimensional object constructed by a set of specific structures oriented in a predetermined direction into a predetermined storage;
    a projection plane setter for setting a directional relationship between a virtual plane of projection on which said virtual three-dimensional object is projected and said virtual three-dimensional object;
    a basic structure setter for setting basic structures in a plurality of patterns each constructed by an arrangement pattern of at least one specific structure included in said set of specific structures in a unit process area in which a predetermined number of specific structures included in said set of specific structures can be arranged;
    a reference position setter for setting a reference position of each of said basic structures in a plurality of patterns;
    a basic image generator for generating basic images in a plurality of patterns by projecting said basic structures in a plurality of patterns onto said virtual plane of projection in accordance with said directional relationship and, also, recognizing a reference image position corresponding to said reference position of each of said basic structures in a plurality of patterns for each of said basic images in a plurality of patterns;
    an area designator for sequentially designating a unit process area to be projected in a three-dimensional area to be processed at a time of projecting said virtual three-dimensional object onto said virtual plane of projection;
    a first detector for detecting a basic structure which matches said unit process area to be projected designated by said area designator from said basic structures in a plurality of patterns;
    an extractor for extracting a basic image corresponding to said basic structure detected by said first detector from said basic images in a plurality of patterns;
    a second detector for detecting a real reference projection position in said virtual plane of projection, to which said reference position of said basic structure detected by said first detector is projected;
    an adjusted image generator for generating adjusted basic images on the basis of said basic image extracted by said extractor by adjusting a positional relationship between said basic image and said virtual plane of projection in accordance with said real reference projection position in each said unit process area to be projected; and a display image generator for generating a display image by combining said adjusted basic images to each other.

3. The image processing device according to claim 2, wherein said basic image generator detects a reference projection position corresponding to said reference position of each of said basic structures and a reference projection distance as a distance between said reference position of each of said basic structures and said reference projection position, detects each of projection distances as distances between predetermined points on said virtual plane of projection and each of said basic structures, and gives a set of a projection distance value of said each of projection distances using said reference projection distance as a reference and a pixel value according to said each of said projection distances to each of pixels of each of said basic images respectively, thereby generating said basic images, said second detector also detects a real reference projection distance corresponding to said real reference projection position, said adjusted image generator adjusts each said positional relationship, each said projection distance value, and each said pixel value in accordance with said real reference projection position and said real reference projection distance on the basis of said basic image extracted by said extractor as a base, thereby generating said adjusted basic images, and said display image generator employs a set of a projection distance value indicative of a minimum projection distance and a pixel value corresponding to said minimum projection distance for a projection position in which a plurality of said adjusted basic images overlap in said virtual plane of projection at a time of combining said adjusted basic images to each other.

4. An image processing device for generating a distance map on the basis of three-dimensional data, comprising:

a reader for reading and storing three-dimensional data indicative of a structure of a virtual three-dimensional object constructed by a set of specific structures oriented in a predetermined direction into a predetermined storage;

a projection plane setter for setting a positional and directional relationship between a virtual plane of projection on which said virtual three-dimensional object is projected and said virtual three-dimensional object;

a reference position setter for setting a reference position of a specific structure included in said set of specific structures;

a basic distance map generator for detecting a reference projection position in which said reference position of said specific structure oriented in said predetermined direction is projected onto said virtual plane of projection and a reference projection distance as a distance between said reference position and said reference projection position in accordance with said positional and directional relationship and, also, detecting projection distances as distances between each of predetermined points on said virtual plane of projection and said specific structure, thereby generating a basic distance map indicative of a distribution of distances between said virtual plane of projection and said specific structure using said reference projection distance as a reference;

a detector for detecting each of reference projection positions and each of reference projection distances corresponding to each said specific structure on said virtual plane of projection by using each said specific structure constructing said virtual three-dimensional object as a target;

an adjusted map generator for generating adjusted basic distance maps on the basis of said basic distance map by adjusting a positional relationship between said basic distance map and said virtual plane of projection and each of said projection distances in accordance with said each of reference projection positions and said each of reference projection distances detected by said detector; and a distance map generator for generating a general distance map indicative of a distribution of distances between said virtual three-dimensional object and said virtual plane of projection by employing a minimum projection distance for a projection position in which a plurality of said adjusted basic distance maps overlap in said virtual plane of projection while combining said adjusted basic distance maps generated by said adjusted map generator to each other.

5. An image processing device for generating a distance map on the basis of three-dimensional data, comprising:

a reader for reading and storing three-dimensional data indicative of a structure of a virtual three-dimensional object constructed by a set of specific structures oriented in a predetermined direction into a predetermined storage;

a projection plane setter for setting a positional and directional relationship between a virtual plane of projection on which said virtual three-dimensional object is projected and said virtual three-dimensional object;

a basic structure setter for setting basic structures in a plurality of patterns each constructed by an arrangement pattern of at least one specific structure included in said set of specific structures in a unit process area in which a predetermined number of specific structures included in said set of specific structures can be arranged;

a reference position setter for setting a reference position of each of said basic structures in a plurality of patterns;

a basic map generator for detecting a reference projection position in which said reference position is projected onto said virtual plane of projection and a reference projection distance as a distance between said reference position and said reference projection position in accordance with said positional and directional relationship and, also, detecting projection distances as distances between each of predetermined points on said virtual plane of projection and each of said basic structures, thereby generating basic distance maps in a plurality of patterns each indicative of a distribution of distances between said virtual plane of projection and each of said basic structures using said reference projection distance as a reference;

an area designator for sequentially designating a unit process area to be projected in a three-dimensional area to be processed;

a first detector for detecting a basic structure which matches said unit process area to be projected designated by said area designator from said basic structures in a plurality of patterns;

an extractor for extracting a basic distance map corresponding to said basic structure detected by said first detector from said basic distance maps in a plurality of patterns;

a second detector for detecting a real reference projection position in said virtual plane of projection, to which said reference position of said basic structure detected by said first detector is projected and a real reference projection distance corresponding to said real reference projection position;

an adjusted map generator for generating an adjusted basic distance maps on the basis of said basic distance map extracted by said extractor by adjusting a positional relationship between said basic distance map and said virtual plane of projection and each of said projection distances in accordance with said real reference projection position and said real reference projection distance detected by said second detector; and a distance map generator for generating a general distance map indicative of a distribution of distances between said virtual three-dimensional object and said virtual plane of projection by employing a minimum projection distance for a projection position in which a plurality of said adjusted basic distance maps overlap in said virtual plane of projection while combining said adjusted basic distance maps to each other.

6. A tangible computer readable medium encoded with a computer executable program for controlling a computer to operate as an image processing device for generating a display image on the basis of three-dimensional data, said computer executable program comprising instructions for:

reading and storing three-dimensional data indicative of a structure of a virtual three-dimensional object constructed by a set of specific structures oriented in a predetermined direction into a predetermined storage;

setting a directional relationship between a virtual plane of projection on which said virtual three-dimensional object is projected and said virtual three-dimensional object;

setting a reference position of a specific structure included in said set of specific structures;

generating a basic image by projecting said specific structure oriented in said predetermined direction onto said virtual plane of projection in accordance with said directional relationship and, also, recognizing a reference image position corresponding to said reference position in said basic image;

detecting each of reference projection positions in which said reference position of each specific structure included in said set of specific structures is projected to said virtual plane of projection at a time of projecting said virtual three-dimensional object onto said virtual plane of projection;

generating adjusted basic images on the basis of said basic image by adjusting a positional relationship between said basic image and said virtual plane of projection in accordance with said each of reference projection positions detected by said detector;

generating a display image by combining said adjusted basic images to each other;

detecting a reference projection position corresponding to said reference position of said specific structure and a reference projection distance as a distance between said reference position and said reference projection position, detecting each of projection distances as distances between predetermined points on said virtual plane of projection and said specific structure, and giving a set of a projection distance value of said each of said projection distances using said reference projection distance as a reference and a pixel value according to said each of projection distances to each of pixels of said basic image respectively, thereby generating said basic image, detecting each of reference projection distances corresponding to said each of reference projection positions, adjusting each said positional relationship, each said projection distance value and each said pixel value in accordance with said each of reference projection positions and said each of reference projection distances detected by said detector on the basis of said basic image as a base, thereby generating said adjusted basic images, and employing a set of a projection distance value indicative of a minimum projection distance and a pixel value corresponding to said minimum projection distance for a projection position in which a plurality of said adjusted basic images overlap in said virtual plane of projection at a time of combining said adjusted basic images to each other.

7. A tangible computer readable medium encoded with a computer executable program for controlling a computer to operate as an image processing device for generating a display image on the basis of three-dimensional data, said computer executable program comprising instructions for:

reading and storing three-dimensional data indicative of a structure of a virtual three-dimensional object constructed by a set of specific structures oriented in a predetermined direction into a predetermined storage;

setting a directional relationship between virtual plane of projection on which said virtual three-dimensional object is projected and said virtual three-dimensional object;

setting basic structures in a plurality of patterns each constructed by an arrangement pattern of at least one specific structure included in said set of specific structures in a unit process area in which a predetermined number of specific structures included in said set of specific structures can be arranged;

setting a reference position of each of said basic structures in a plurality of patterns;

generating basic images in a plurality of patterns by projecting said basic structures in a plurality of patterns onto said virtual plane of projection in accordance with said directional relationship and, also, recognizing a reference image position corresponding to said reference position of each of said basic structures in a plurality of patterns for each of said basic images in a plurality of patterns;

sequentially designating a unit process area to be projected in a three-dimensional area to be processed at a time of projecting said virtual there-dimensional object onto said virtual plane of projection;

detecting a basic structure which matches said unit process area to be projected designated by said area designator from said basic structures in a plurality of patterns;

extracting a basic image corresponding to said basic structure from said basic images in a plurality of patterns;

detecting a real reference projection position in said virtual plane of projection, to which said reference position of said basic structure is projected;

generating adjusted basic images on the basis of said basic image by adjusting a positional relationship between said basic image and said virtual plane of projection in accordance with said real reference projection position in each said unit process area to be projected; and generating a display image by combining said adjusted basic images to each other.

8. The tangible computer readable medium according to claim 7, further comprising:

detecting a reference projection position corresponding to said reference position of each of said basic structures and a reference projection distance as a distance between said reference position of each of said basic structures and said reference projection position, detecting each of projection distances as distances between predetermined points on said virtual plane of projection and each of said basic structures, and giving a set of a projection distance value of said each of projection distances using said reference projection distance as a reference and a pixel value according to said each of said projection distances to each of pixels of each of said basic images respectively, thereby generating said basic images, detecting a real reference projection distance corresponding to said real reference projection position, adjusting each said positional relationship, each said projection distance value, and each said pixel value in accordance with said real reference projection position and said real reference projection distance on the basis of said basic image as a base, thereby generating said adjusted basic images, and employing a set of a projection distance value indicative of a minimum projection distance and a pixel value corresponding to said minimum projection distance for a projection position in which a plurality of said adjusted basic images overlap in said virtual plane of projection at a time of combining said adjusted basic images to each other.

9. A tangible computer readable medium encoded with a computer executable program for controlling a computer to operate as an image processing device for generating a distance map on the basis of three-dimensional data, said computer executable program comprising instructions for:

reading and storing three-dimensional data indicative of a structure of a virtual three-dimensional object constructed by a set of specific structures oriented in a predetermined direction into a predetermined storage;

setting a positional and directional relationship between a virtual plane of projection on which said virtual three-dimensional object is projected and said virtual three-dimensional object;

setting a reference position of a specific structure included in said set of specific structures;

detecting a reference projection position in which said reference position of said specific structure oriented in said predetermined direction is projected onto said virtual plane of projection and a reference projection distance as a distance between said reference position and said reference projection position in accordance with said positional and directional relationship and, also, detecting projection distances as distances between each of predetermined points on said virtual plane of projection and said specific structure, thereby generating a basic distance map indicative of a distribution of distances between said virtual plane of projection and said specific structure using said reference projection distance as a reference;

detecting each of reference projection positions and each of reference projection distances corresponding to each said specific structure on said virtual plane of projection by using each said specific structure constructing said virtual three-dimensional object as a target;

generating adjusted basic distance maps on the basis of said basic distance map by adjusting a positional relationship between said basic distance map and said virtual plane of projection and each of said projection distances in accordance with said each of reference projection positions and said each of reference projection distances; and generating a general distance map indicative of a distribution of distances between said virtual three-dimensional object and said virtual plane of projection by employing a minimum projection distance for a projection position in which a plurality of said adjusted basic distance maps overlap in said virtual plane of projection while combining said adjusted basic distance maps to each other.

10. A tangible computer readable medium encoded with a computer executable program for controlling a computer to operate as an image processing device for generating a distance map on the basis of three-dimensional data, said computer executable program comprising instructions for:

reading and storing three-dimensional data indicative of a structure of a virtual three-dimensional object constructed by a set of specific structures oriented in a predetermined direction into a predetermined storage;

setting a positional and directional relationship between a virtual plane of projection on which said virtual three-dimensional object is projected and said virtual three-dimensional object;

setting basic structures in a plurality of patterns each constructed by an arrangement pattern of at least one specific structure included in said set of specific structures in a unit process area in which a predetermined number of specific structures included in said set of specific structures can be arranged;

setting a reference position of each of said basic structures in a plurality of patterns;

detecting a reference projection position in which said reference position is projected onto said virtual plane of projection and a reference projection distance as a distance between said reference position and said reference projection position in accordance with said positional and directional relationship and, also, detecting projection distances as distances between each of predetermined points on said virtual plane of projection and each of said basic structures, thereby generating basic distance maps in a plurality of patterns each indicative of a distribution of distances between said virtual plane of projection and each of said basic structures using said reference projection distance as a reference;

sequentially designating a unit process area to be projected in a three-dimensional area to be processed;

detecting a basic structure which matches said unit process area to be projected designated by said area designator from said basic structures in a plurality of patterns;

extracting a basic distance map corresponding to said basic structure from said basic distance maps in a plurality of patterns;

detecting a real reference projection position in said virtual plane of projection, to which said reference position of said basic structure is projected and a real reference projection distance corresponding to said real reference projection position;

generating an adjusted basic distance maps on the basis of said basic distance map by adjusting a positional relationship between said basic distance map and said virtual plane of projection and each of said projection distances in accordance with said real reference projection position and said real reference projection distance; and generating a general distance map indicative of a distribution of distances between said virtual three-dimensional object and said virtual plane of projection by employing a minimum projection distance for a projection position in which a plurality of said adjusted basic distance maps overlap in said virtual plane of projection while combining said adjusted basic distance maps to each other.

11. An image processing device for generating a display image by volume rendering, comprising:
- a parameter setter for setting a parameter for changing a processing ratio between an image order process and an object order process in volume rendering to a value which varies step by step;
- a reader for reading and storing volume data of a three-dimensional area to be processed into a predetermined storage;
- a rendering part for performing volume rendering based on said volume data;
- a measuring part for measuring process time required for volume rendering based on said volume data by said rendering part with respect to each of parameters which are set to values which vary step by step by said parameter setter;
- a temporary storage for temporarily storing said parameters which vary step by step and process time measured by said measuring part in correspondence with each of said parameters which vary step by step so that each of said parameters and said process time corresponding to each of said parameters are associated with each other; and
- a parameter determining part for determining a parameter corresponding to a shortest process time among a plurality of process times stored in said temporary storage as a parameter for said volume data.

12. The image processing device according to claim 11, wherein
- said rendering part generates three-dimensional data on the basis of said volume data and, also, performs volume rendering based on said three-dimensional data, and
- said parameter is a parameter for determining resolution of said three-dimensional data.

13. A tangible computer readable medium encoded with a computer executable program for controlling a computer to operate as an image processing device for generating a display image by volume rendering, said computer executable program comprising instructions for:
- setting a parameter for changing a processing ratio between an image order process and an object order process in volume rendering to a value which varies step by step;
- reading and storing volume data of a three-dimensional area to be processed into a predetermined storage;
- performing volume rendering based on said volume data;
- measuring process time required for volume rendering based on said volume data by said rendering part with respect to each of parameters which are set to values which vary step by step;
- temporarily storing said parameters which vary step by step and process time measured by said measuring part in correspondence with each of said parameters which vary step by step so that each of said parameters and said process time corresponding to each of said parameters are associated with each other; and
- determining a parameter corresponding to a shortest process time among a plurality of process times stored as a parameter for said volume data.

14. The tangible computer readable medium according to claim 13, further comprising generating three-dimensional data on the basis of said volume data and, also, performs volume rendering based on said three-dimensional data,
- wherein said parameter is a parameter for determining resolution of said three-dimensional data.

* * * * *

UNITED STATES PATENT AND TRADEMARK OFFICE
CERTIFICATE OF CORRECTION

PATENT NO. : 7,576,737 B2  Page 1 of 1
APPLICATION NO. : 11/226522
DATED : August 18, 2009
INVENTOR(S) : Fujiwara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Seventh Day of September, 2010

David J. Kappos
*Director of the United States Patent and Trademark Office*